United States Patent
Morioka et al.

(10) Patent No.: US 8,971,817 B2
(45) Date of Patent: Mar. 3, 2015

(54) COMMUNICATION APPARATUS AND COMMUNICATION METHOD, COMPUTER PROGRAM, AND COMMUNICATION SYSTEM

(75) Inventors: Yuichi Morioka, Tokyo (JP); Kazuyuki Sakoda, Tokyo (JP); Hiroaki Takano, Saitama (JP)

(73) Assignee: Sony Corporation, Tokyo (JP)

( * ) Notice: Subject to any disclaimer, the term of this patent is extended or adjusted under 35 U.S.C. 154(b) by 742 days.

(21) Appl. No.: 13/201,355

(22) PCT Filed: Feb. 9, 2010

(86) PCT No.: PCT/JP2010/051898
§ 371 (c)(1),
(2), (4) Date: Aug. 12, 2011

(87) PCT Pub. No.: WO2010/098203
PCT Pub. Date: Sep. 2, 2010

(65) Prior Publication Data
US 2012/0028588 A1 Feb. 2, 2012

(30) Foreign Application Priority Data
Feb. 26, 2009 (JP) ................. P2009-044649

(51) Int. Cl.
*H04B 7/00* (2006.01)
*H04B 7/06* (2006.01)
(Continued)

(52) U.S. Cl.
CPC ............ *H04B 7/0617* (2013.01); *H04B 7/0848* (2013.01); *H04B 7/0865* (2013.01); *H04W 72/046* (2013.01); *H04W 74/002* (2013.01)
USPC .......................................... 455/63.4; 455/515

(58) Field of Classification Search
CPC ....................................................... H04B 7/043
USPC .................................................. 455/63.4, 515
See application file for complete search history.

(56) References Cited

U.S. PATENT DOCUMENTS

| | | | |
|---|---|---|---|
| 2002/0115458 A1* | 8/2002 | Mizuno et al. | 455/507 |
| 2005/0135242 A1* | 6/2005 | Larsen et al. | 370/229 |

(Continued)

FOREIGN PATENT DOCUMENTS

| | | |
|---|---|---|
| JP | 2004-32062 | 1/2004 |
| JP | 2004-032062 | 1/2004 |

(Continued)

OTHER PUBLICATIONS

Feb. 5, 2013, Japanese Office Action for related application No. JP 2009-044649.

(Continued)

*Primary Examiner* — Wen Huang
(74) *Attorney, Agent, or Firm* — Sherr & Jiang, PLLC

(57) ABSTRACT

To appropriately effect a coordination with a plurality of communication parties that perform a millimeter wave communication.
Transmission and reception beams of the respective terminal stations are directed to an access point, a valid communication link based on the second communication method is utilized as a link for a high speed data transmission between the access point and the respective terminal stations. Of course, the communication link based on the first communication method between the access point and the respective terminal stations is valid and is utilized as a link for the coordination. As the transmission and reception beams are not directed between the terminal stations, the communication link based on the second communication method is invalid, but the valid communication link based on the first communication method can be utilized as the link for the coordination.

20 Claims, 20 Drawing Sheets

(51) Int. Cl.
*H04B 7/08* (2006.01)
*H04W 72/04* (2009.01)
*H04W 74/00* (2009.01)

(56) References Cited

U.S. PATENT DOCUMENTS

| | | | |
|---|---|---|---|
| 2005/0233734 A1* | 10/2005 | Rajkotia et al. | 455/414.1 |
| 2009/0016460 A1* | 1/2009 | Hwang et al. | 375/267 |
| 2009/0232049 A1* | 9/2009 | Singh et al. | 370/328 |
| 2010/0159845 A1* | 6/2010 | Kaaja et al. | 455/70 |

FOREIGN PATENT DOCUMENTS

| | | |
|---|---|---|
| JP | 3544891 | 4/2004 |
| JP | 2007-517474 | 6/2007 |
| JP | 2008-502173 | 1/2008 |
| JP | 2008-48119 | 2/2008 |
| JP | 2008-512954 | 4/2008 |
| JP | 2008-199593 | 8/2008 |

OTHER PUBLICATIONS

English-language Abstract of International Patent Application No. PCT/US2005/031641, filed Sep. 7, 2005.
English-language Abstract of International Patent Application No. PCT/JP2005/010004, filed May 25, 2005.
English-language Abstract of International Patent Application No. PCT/US2004/043371, filed Dec. 24, 2004.
Sep. 24, 2013, CN Office Action for related Chinese application No. 201080007704.1.

* cited by examiner

COMMUNICATION APPARATUS AND COMMUNICATION METHOD, COMPUTER PROGRAM, AND COMMUNICATION SYSTEM

TECHNICAL FIELD

The present invention relates, for example, to a communication apparatus and a communication method for performing a wireless communication utilizing millimeter waves, a computer program, and a communication system and particularly relates to a communication apparatus and a communication method for extending a communication distance of millimeter waves by directing beam of a directional antenna toward a direction where a communication party is located, a computer program, and a communication system.

BACKGROUND ART

A wireless communication called "millimeter waves" can realize a speed-up of a communication speed utilizing high frequency electromagnetic waves. As a main use of the millimeter wave communication, a short distance wireless access communication, an image transmission system, a simplicity radio, an automobile collision avoidance radar, and the like are exemplified. Also, at present, a technology development of the millimeter wave communication aimed at promotion of utilization such as realization of a large capacity long distance transmission, miniaturization of a wireless apparatus, and reduction in costs is carried out. Here, a wavelength of the millimeter wave is 10 mm to 1 mm and is equivalent to 30 GHz to 300 GHz in frequency. For example, in a wireless communication using the 60 GHz band, as it is possible to perform a channel allocation in units of GHz, an extremely high speed data communication can be carried out.

Also as compared with micro waves widely spread in a wireless LAN (Local Area Network) technology or the like, the millimeter wave has a short wavelength and a strong straight advancing property, and it is possible to transmit an extremely large information amount. In contrast to that, as the millimeter wave has an intense attenuation associated with a reflection, for a wireless path where a communication is carried out, a direct wave or a wave reflected once about the most. Also, as a propagation loss is large, the millimeter wave has such a property that the wireless signal does not reach far.

To compensate the above-mentioned flying distance problem of the millimeter wave, a method is conceivable that an antennal of a transreceiver is set to have a directivity, and a transmission beam and a reception beam thereof are directed toward a direction in which the communication party is positioned to extend a communication distance. The directivity of the beam can be controlled, for example, by providing a plurality of antennas respectively to the transreceivers and changing a transmission weight or a reception weight for each antenna. In the millimeter wave, as the reflected wave is hardly used and the direct wave becomes important, a beam-shaped directivity is suitable, and it is conceivable to use a sharp beam for the directivity. Then, after a training on an optimal directivity of the antenna is conducted, the millimeter wave wireless communication may be carried out.

For example, a wireless transmission system is proposed in which after a signal for deciding a directivity direction of the transmission antenna is transmitted by second communication means utilizing a communication based on one of a power line communication, an optical communication, and an acoustic communication to decide the direction of the transmission antenna, a wireless transmission between the transreceivers is carried out by first communication means using radio waves equal to or higher than 10 GHz (for example, see PTL 1).

Also, a method of extending the communication distance by utilizing the directivity of the antenna is applied to IEEE802.15.3c that is a standard for a wireless PAN (mmW-PAN: millimeter-wave Wireless Personal Area Network) using the millimeter-wave band.

However, according to the method of extending the communication distance by utilizing the directivity of the antenna, an adverse effect exists that an improvement in the transmission reception power of millimeter wave signals in a direction of a particular communication party can be observed, but the millimeter wave signals do not reach the peripheral station that does not exist in the direction. For example, when a control signal such as a beacon for effecting a coordination is transmitted to a plurality of communication stations at the same time with a control frame, it is obvious that the directional communication is not appropriate. Also, according to the directional communication, the communication link is easily invalidated along with a travel of the communication station, and a situation may occur that a desired communication cannot be carried out by any means.

For example, a wireless terminal apparatus is proposed which is provided with position information obtaining means such as a GPS (Global Positioning System) unit, obtains position information of its own apparatus, and also exchanges mutual position information with the communication party to control the directivity of the directional antenna for performing a long distance data transmission by millimeter waves (for example, see PTL 2). According to the same wireless terminal apparatus, even when the positional relation with the communication party is fluctuated, it is possible to escape from a situation in which the communication cannot be carried out by exchanging the position information and adjusting the directivity of the antenna, but it is necessary to increase apparatus costs along with the mounting of the position information obtaining means and implement a communication procedure for exchanging the position information with the communication party. Also, the same wireless terminal apparatus is configured to transmit the data with the radio waves of the millimeter-wave band having a broadband performance and transmit control information with the radio waves of microwave band, but as only a path search processing is carried out on the control line, the coordination cannot be effected.

CITATION LIST

Patent Literature

PTL 1: Japanese Patent No. 3544891
PTL 2: Japanese Unexamined Patent Application Publication No. 2008-48119

DISCLOSURE OF INVENTION

Technical Problem

An object of the present invention is to provide an excellent communication apparatus and a communication method with which it is possible to extend a communication distance of a millimeter wave by directing a beam of a directional antenna toward a direction in which a communication party is positioned, a computer program, and a communication system.

A further object of the present invention is to provide an excellent communication apparatus and a communication method with which it is possible to appropriately effect a coordination between a plurality of communication parties that perform a millimeter wave communication or a directional communication, a computer program, and a communication system.

A further object of the present invention is to provide an excellent communication apparatus and a communication method with which it is possible to preferably recover a situation in which a communication can be carried out, a computer program, and a communication system even when the communication link of the millimeter wave communication is invalidated along with the fluctuation of the positional relation with the communication party or the like.

Technical Solution

The present application has been made while taking into account the above-mentioned problems, and an embodiment of the invention is a communication apparatus including:

a first wireless communication unit that performs a wireless communication in conformity with the first communication method; and a second wireless communication unit that can perform a directional wireless communication in conformity with the second communication method using a frequency band higher than the first communication method, in which a control frame including control information for effecting a coordination with one or more communication parties that perform a wireless communication in conformity with the second communication method is transmitted from the first wireless communication unit.

Here, for the control information, information related to a capability of the wireless communication in conformity with the second communication method by the second communication unit, information related to a channel used in the wireless communication in conformity with the second communication method by the second communication unit, information related to a transmission beam or a reception beam formed when the wireless communication in conformity with the second communication method is performed by the second communication unit, and information related to a timing when the communication party starts a transmission operation in conformity with the second communication method which is allocated to the communication party can be included.

Also, according to an embodiment of the invention described in the present application, the communication apparatus has a configuration in which, with respect to the communication party, a frame including information for specifying a timing when the communication party should transmit a link maintenance frame for checking a validity of a communication link in conformity with the second communication method is transmitted from the first wireless communication unit in conformity with the first communication method, and at the transmission timing, the second wireless communication unit stands by for a reception of the link maintenance frame in conformity with the second communication method.

Also, according to an embodiment of the invention described in the present application, the control information includes information related to a timing when the communication party starts a transmission operation in conformity with the second communication method which is allocated to the communication party. Then, the communication apparatus has a configuration in which an RTS transmitted by the communication party in accordance with the transmission starting timing in conformity with the second communication method is subjected to a reception processing as the link maintenance frame.

Also, according to an embodiment of the invention described in the present application, the communication apparatus has a configuration in which, in a case where the link maintenance frame cannot be received at the transmission timing, the timing when the link maintenance frame should be transmitted by the one or more communication parties and the reschedule frame including the information related to the rescheduled transmission timing is transmitted from the first wireless communication unit in conformity with the first communication method.

Also, according to an embodiment of the invention described in the present application, the communication apparatus has a configuration in which when a training request frame for requesting a retraining on a directivity of a transmission and reception beams is received from the communication party in conformity with the first communication method, a training request response frame is replied in conformity with the first communication method, and also a retraining processing on the directivity of the transmission and reception beams is executed with the communication party.

Also, an embodiment of the invention described in the present application is a communication method in a communication apparatus provided with a first wireless communication unit that performs a wireless communication in conformity with the first communication method and a second wireless communication unit that can perform a directional wireless communication in conformity with a second communication method using a frequency band higher than the first communication method, the communication method including:

a step of transmitting a control frame including control information for effecting a coordination with one or more communication parties that perform a wireless communication in conformity with the second communication method from the first wireless communication unit.

Also, an embodiment of the invention described in the present application is a communication apparatus including:

a first wireless communication unit that performs a wireless communication in conformity with the first communication method; and a second wireless communication unit that can perform a directional wireless communication in conformity with a second communication method using a frequency band higher than the first communication method, in which a control frame including control information for effecting a coordination with one or more communication parties that perform a wireless communication in conformity with the second communication method is received by the first wireless communication unit.

Also, according to an embodiment of the invention described in the present application, the control information includes information related to a timing when a transmission operation in conformity with the second communication method is started by itself which is allocated from the communication party, the communication apparatus has a configuration in which a transmission operation in conformity with the second communication method by the second wireless communication unit is started in conformity with the transmission starting timing.

Also, according to an embodiment of the invention described in the present application, the communication apparatus has a configuration in which from the communication party, a frame including information for specifying a timing when a link maintenance frame for checking a validity of a communication link in conformity with the second communication method should be transmitted is received by the first wireless communication unit in conformity with the first communication method, and at the transmission timing, the link maintenance frame is transmitted by the second wireless communication unit in conformity with the second communication method.

Also, according to an embodiment of the invention described in the present application, the control information includes information related to a timing when a transmission operation in conformity with the second communication method is started by itself which is allocated from the communication party, and the communication apparatus has a configuration in which in accordance with the transmission starting timing, an RTS doubling as the link maintenance frame is transmitted in conformity with the second communication method.

Also, according to an embodiment of the invention described in the present application, the communication apparatus has a configuration in which an RTS is transmitted in conformity with the second communication method in accordance with a predetermined transmission start timing, and also a doubling as the link maintenance frame is subjected to a reception processing.

Also, according to an embodiment of the invention described in the present application, the communication apparatus has a configuration in which in a case where the link maintenance frame cannot be received, a training request frame is transmitted from the first wireless communication unit in conformity with the first communication method, and also in response to a reception of a training request response frame from the communication party in conformity with the first communication method, a retraining processing on the directivity of the transmission and reception beams is executed with the communication party.

Also, according to an embodiment of the invention described in the present application, the communication apparatus has a configuration in which in synchronization with an interval during which a transmission of a data frame is performed from the second wireless communication unit to the communication party in conformity with the second communication method, a transmission of the data frame is performed from the first wireless communication unit to the communication party in conformity with the first communication method.

Also, according to an embodiment of the invention described in the present application, the communication apparatus has a configuration in which at a timing independent from a transmission of a data frame from the second wireless communication unit to the communication party in conformity with the second communication method, the transmission of the data frame is performed from the first wireless communication unit to the communication party in conformity with the first communication method.

Also, an embodiment of the invention described in the present application is a communication method in a communication apparatus provided with a first wireless communication unit that performs a wireless communication in conformity with a first communication method and a second wireless communication unit that can perform a directional wireless communication in conformity with a second communication method using a frequency band higher than the first communication method, the communication method including:

a step of receiving a control frame including control information for effecting a coordination with one or more communication parties that perform a wireless communication in conformity with the second communication method by the first wireless communication unit.

Also, an embodiment of the invention described in the present application is a computer program described in a computer-readable format for executing, on a computer, a communication processing in a communication apparatus provided with a first wireless communication unit that performs a wireless communication in conformity with a first communication method and a second wireless communication unit that can perform a directional wireless communication in conformity with a second communication method using a frequency band higher than the first communication method, the computer program causing the computer to function as:

means for transmitting a control frame including control information for effecting a coordination with one or more communication parties that perform a wireless communication in conformity with the second communication method from the first wireless communication unit.

Also, an embodiment of the invention described in the present application is a computer program described in a computer-readable format for executing, on a computer, a communication processing in a communication apparatus provided with a first wireless communication unit that performs a wireless communication in conformity with a first communication method and a second wireless communication unit that can perform a directional wireless communication in conformity with a second communication method using a frequency band higher than the first communication method, the computer program causing the computer to function as:

means for receiving a control frame including control information for effecting a coordination with one or more communication parties that perform a wireless communication in conformity with the second communication method by the first wireless communication unit.

The respective computer programs according to embodiments of the present application define a computer programs described in a computer-readable format to realize a predetermined processing on the computer. In other words, by installing the respective computer programs into the computer, a cooperative action is exercised on the computer, and it is possible to respectively obtain a action effect similar to the respective communication apparatuses of embodiments of the present application.

Also, an embodiment of the invention described in the present application is a communication including:

a first communication apparatus which is provided with a first wireless communication unit that performs a wireless communication in conformity with a first communication method and a second wireless communication unit that can perform a directional wireless communication in conformity with a second communication method using a frequency band higher than the first communication method and which transmits a control frame including control information for effecting a coordination with one or more communication parties that perform a wireless communication in conformity with the second communication method from the first wireless communication unit; and a second communication apparatus which is provided with a first wireless communication unit that performs a wireless communication in conformity with the first communication method and a second wireless communication unit that can perform a directional wireless communication in conformity with the second communication method using a frequency band higher than the first communication method and which receives the control frame by the first wireless communication unit to the first communication apparatus as the communication party.

It should be noted however that the "system" referred herein refers to an object where a plurality of apparatuses (or function modules for realizing particular functions) are logically aggregated, and whether or not the respective apparatuses or function modules exist in a single casing does not particularly matter.

Advantageous Effects of Invention

According to the present invention, it is possible to provide an excellent communication apparatus and a communication method with which the communication distance of the millimeter wave can be extended by directing the beam of the directional antenna toward the direction in which the communication party is positioned, a computer program, and a communication system.

Also, according to the present invention, it is possible to provide an excellent communication apparatus and a communication method with which the coordination can be appropriately effected between the plurality of communication parties that perform the millimeter wave communication or the directional communication, a computer program, and a communication system.

Also, according to the present invention, it is possible to provide an excellent communication apparatus and a communication method with which even when the communication link of the millimeter wave communication is invalidated along with the fluctuation of the positional relation with the communication party or the like, the situation can be appropriately recovered in which the communication can be carried out, a computer program, and a communication system.

According to an embodiment of the invention described in the present application, the communication apparatus uses, for example, the first communication method which is nondirectional and has no flying distance problems with use of the 5 GHz band in an auxiliary manner to effect the coordination with the communication party, so that it is possible to realize the high speed data communication in conformity with the second communication method using the millimeter waves. Also, even in a case where the directional communication link in conformity with the second communication method using the millimeter waves is invalidated along with the fluctuation of the positional relation with the communication party or the like, it is possible to appropriately recover the situation in which the communication can be carried out.

Also, according to an embodiment of the invention described in the present application, for the control information described in the control frame such as the beacon, in addition to the information for effecting the coordination in the second communication method, it is possible to include additional information such as the information related to the capability of the wireless communication in conformity with the second communication method which is provided to the communication apparatus operating as a coordinator such as an access point that becomes a beacon transmission source, the information related to the channel used in the wireless communication in conformity with the second communication method, and the information related to the transmission beam or the reception beam formed when the wireless communication in conformity with the second communication method is carried out.

Also, according to an embodiment of the invention described in the present application, when the link maintenance proceeding is carried out, by utilizing the first communication method which is nondirectional and has no flying distance problems in an auxiliary manner, it is possible to previously mutually arrange the timing when the link maintenance frame for checking the validity of the communication link in conformity with the second communication method is transmitted.

Also, according to an embodiment of the invention described in the present application, the present application invention is applied to the communication system where the collision is avoided in conformity with the RTS/CTS hand shaking procedure, the control frame such as the RTS or the CTS in which the transmission timing is determined between the transmission and reception can double as the link maintenance frame.

Also, according to an embodiment of the invention described in the present application, the communication party that cannot receive the link maintenance frame is regarded to be out of the communication range based on the second communication method and can perform the rescheduling by releasing the transmission timing allocated to the relevant communication party, and as a result, it is possible to effectively use the band.

Also, according to an embodiment of the invention described in the present application, as the retraining on the directivity of the transmission and reception beams can be carried out between the communication parties out of the communication range based on the second communication method by utilizing the first communication method in an auxiliary manner, it is possible to appropriately recover the situation in which the communication can be carried out with the communication party where the communication link of the millimeter wave communication or the directional communication is invalidated along with the fluctuation of the positional relation or the like.

Also, according to an embodiment of the invention described in the present application, when the data transmission in conformity with the second communication method is carried out, in synchronization with this, the communication apparatus can perform the data transmission in conformity with the first communication method in addition.

Also, according to an embodiment of the invention described in the present application, the communication apparatus can perform the data transmission in conformity with the first communication method at the scheduling independent from the data transmission in conformity with the second communication method.

Further objects, features, and advantages of the present invention will become apparent from embodiments of the present invention which will be described below and a more detailed description based on the attached drawings.

DESCRIPTION OF EMBODIMENTS

Figure 1:
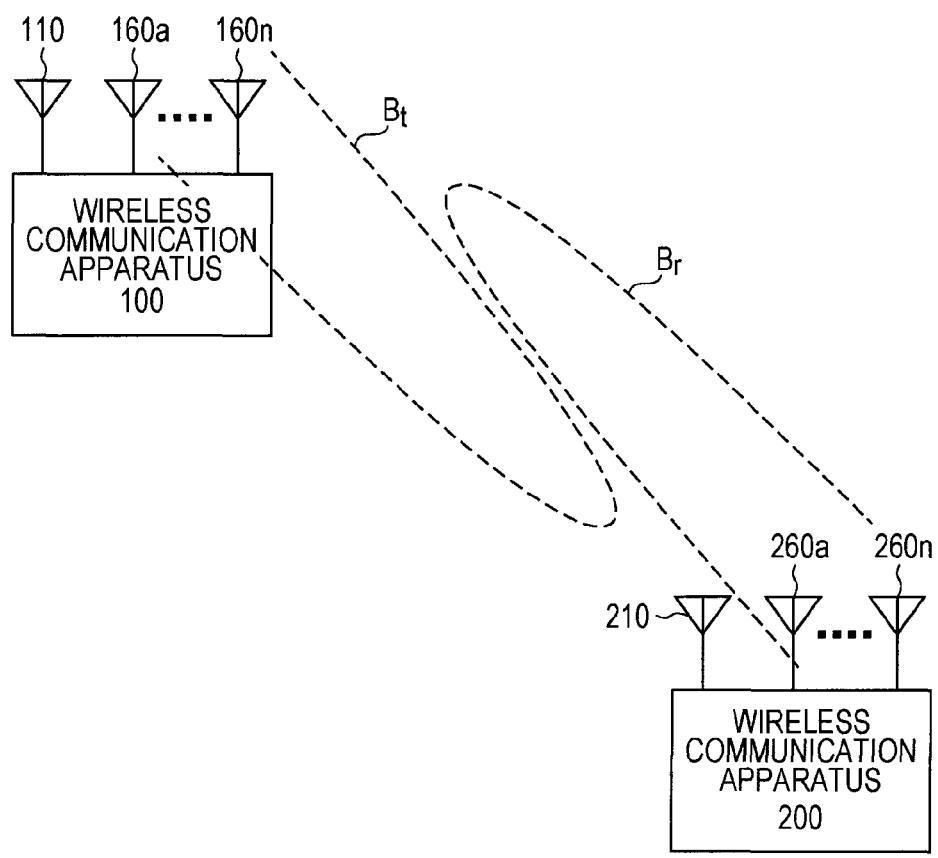
FIG. 1 schematically illustrates a configuration example of a millimeter-wave wireless communication system according to an embodiment of the present invention.

Hereinafter, embodiments of the present invention will be described in detail with reference to the drawings.

As already described in the section of background art, the wireless communication system utilizing the millimeter waves uses a plurality of transmission reception antennas and form a sharp antenna directivity (that is, a beam-shaped antenna directivity), so that a communication range thereof can be expanded. However, although the communication distance can be extended by directing the beam toward the direction of the position of the communication party, the directional communication is not appropriate to the transmission of the control frame, which leads to a concern that the coordination cannot be effected, the communication cannot be carried out as it is once the communication link is invalidated through a variation of a positional relation with the communication party, or the like.

For example, in the directional communication system utilizing the micro waves regulated by IEEE802.11 (5 GHz band), by transmitting the frame for the coordination at a communication rate lower than that at the time of the data transmission, information such as a scheduling within a frame period is widely conveyed to peripheral stations, so that the coordination is effected more reliably. However, in the communication using the millimeter waves, even when a communication rate is set low, there is a possibility that the signal may not sufficiently reach the peripheral stations.

In view of the above, a wireless communication system according to the present embodiment uses a wireless communication in the 5 GHz band in combination with a wireless communication in the 60 GHz band and utilizes the 5 GHz band for a transmission of control information for effecting the coordination in the communication in the 60 GHz band such as a beacon in an auxiliary manner, so that the control information reaches the peripheral stations.

As compared with the millimeter waves, in a first communication method using the micro waves, the straight advancing property is not intense, and the attenuation at the time of the reflection is small, so that it is therefore possible to mutually perform the communication without taking into account the directivity of the transmission beam and the reception beam. In contrast to this, a second communication method uses the millimeter waves, as the straight advancing property is intense and the attenuation at the time of the reflection is large, it is preferable to transmit and receive the wireless signals while directing the transmission beam and the reception beam toward the communication party.

In the following description, the first communication method is set as a communication system using electromagnetic waves of micro waves used in the IEEE802.11a/b/g widely spread as the wireless LAN standard (5 GHz band), and the second communication method on the other hand is set as the 60 GHz band used in VHT (Very High Throughput) standard. It should be noted however that in the gist of the present invention, the first and second communication methods are not necessarily limited to the particular frequency bands.

FIG. 1 schematically illustrates a configuration example of a millimeter-wave wireless communication system according to an embodiment of the present invention. The wireless communication system illustrated in the drawing is composed of a wireless communication apparatus 100 and a wireless communication apparatus 200.

The wireless communication apparatuses 100 and 200 use both the first communication method and the second communication method described above and can mutually perform the wireless communication. As compared with the millimeter waves, in the first communication method using the micro waves, the straight advancing property is not intense, and the attenuation at the time of the reflection is small. Therefore, when the wireless communication apparatuses 100 and 200 perform the wireless communication in conformity with the first communication method, it is possible to mutually perform the communication without taking into account the directivity of the transmission beam and the reception beam. On the other hand, as the second communication method uses the millimeter waves, the straight advancing property is intense and the attenuation at the time of the reflection is large. When the wireless communication apparatuses 100 and 200 perform the wireless communication in conformity with the second communication method, it is more preferable to transmit and receive the wireless signals by respectively directing the transmission beam and the reception beam to the communication party.

In the example illustrated in FIG. 1, the wireless communication apparatus 100 is provided with an antenna 110 for transmitting and receiving the wireless signals in conformity with the first communication method and a plurality of antennas 160a to 160n for transmitting and receiving the wireless signals in conformity with the second communication method. Then, by adjusting weights of the signals transmitted via the respective antennas 160a to 160n, the directivity of the transmission beam $B_t$ at the time of the wireless communication in conformity with the second communication method is set to be controlled. In the example illustrated in the drawing, the transmission beam $B_t$ is directed toward the direction of the position of the wireless communication apparatus 200 that becomes the communication party.

Also, the wireless communication apparatus 200 is provided with an antenna 210 for transmitting and receiving the wireless signals in conformity with the first communication method and a plurality of antennas 260a to 260n for transmitting and receiving the wireless signals in conformity with the second communication method. Then, by adjusting weights of the signals received via the respective antennas 260a to 260n, the directivity of the reception beam $B_r$ at the time of the wireless communication in conformity with the second communication method is set to be controlled. In the example illustrated in the drawing, the reception beam $B_r$ is directed toward the direction of the position of the wireless communication apparatus 100 that becomes the communication party.

Figure 2:
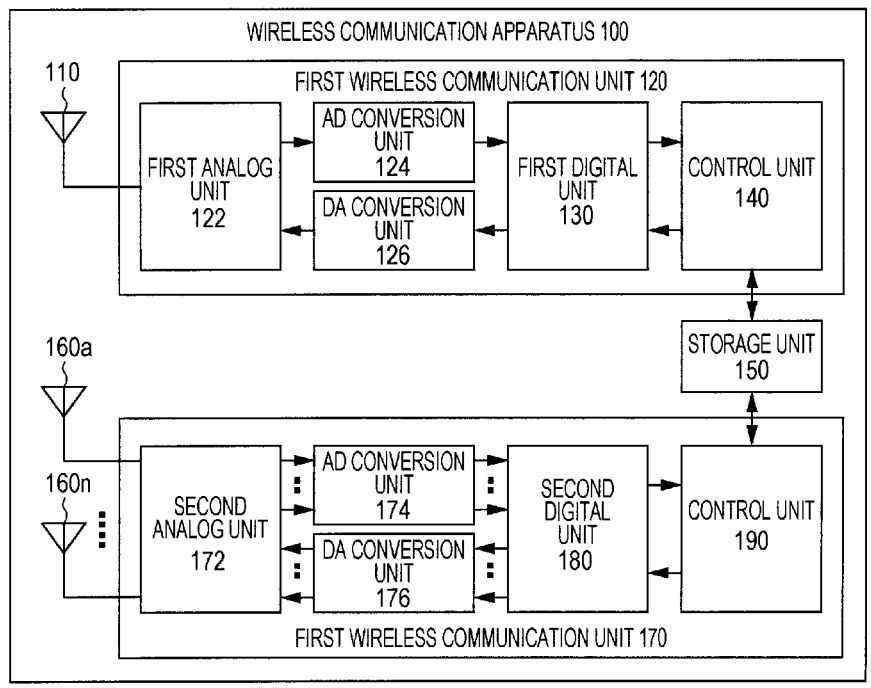
FIG. 2 illustrates a configuration example of a wireless communication apparatus 100.

FIG. 2 illustrates a configuration example of the wireless communication apparatus 100. The wireless communication apparatus 100 illustrated in the drawing may be operated as a broadband router or a wireless access point. It should be noted that although not illustrated in the drawing, the wireless communication apparatus 200 may also have a similar configuration.

The wireless communication apparatus 100 is provided with the antenna 110, a first wireless communication unit 120, a storage unit 150, the plurality of antennas 160a to 160n, and a second wireless communication unit 170. The first wireless communication unit 120 is composed of a first analog unit 122, an AD (Analog-to-Digital) conversion unit 124, a DA (Digital-to-Analog) conversion unit 126, a first digital unit 130, and a control unit 140. Also, the second wireless communication unit 170 is composed of a second analog unit 172, an AD conversion unit 174, a DA conversion unit 176, a second digital unit 180, and a control unit 190.

The antenna 110 is an antenna used for the wireless communication in conformity with the first communication method. The antenna 110 transmits, for example, the control signal for effecting the coordination in the second communication method such as the beacon in conformity with the first communication method using the micro waves. Also, the antenna 110 receives the control signal for effecting the coordination in the second communication method such as the beacon in conformity with the first communication method to be output to the first analog unit 122.

The first analog unit 122 is typically equivalent to an RF circuit (Radio Frequency) for transmitting and receiving the wireless signal in conformity with the first communication method. That is, the first analog unit 122 performs a low noise amplification on the RF reception signal received by the antenna 110 and also a down-conversion to be output to the AD conversion unit 124 in a later stage. Also, the first analog unit 122 performs an up-conversion on the transmission signal converted into the analog signal by the DA conversion unit 126 to the RF band and also performs a power amplification to be output to the antenna 110.

The AD conversion unit 124 converts the analog reception signal input from the first analog unit 122 into the digital signal to be output to the first digital unit 130 in a later stage. Also, the DA conversion unit 126 converts the digital transmission signal input from the first digital unit 130 into the analog signal to be output to the first analog unit 122.

Figure 3:
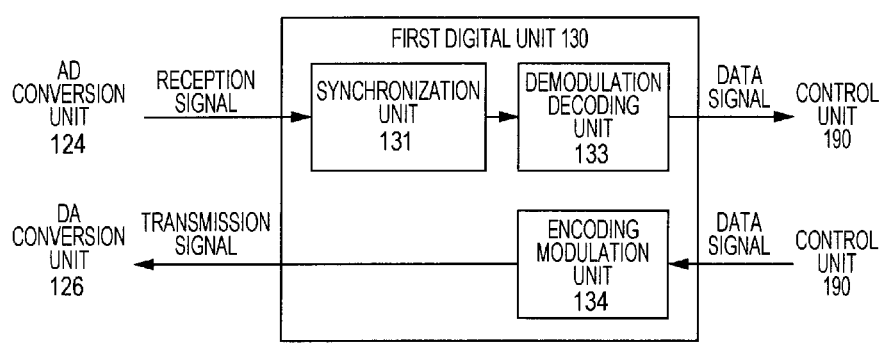
FIG. 3 illustrates an example of an internal configuration of a first digital unit 130.

FIG. 3 illustrates an example of an internal configuration of the first digital unit 130. As illustrated in the drawing, the first digital unit 130 is composed of a synchronization unit 131, a demodulation decoding unit 132, and an encoding modulation unit 133. In accordance with the detection of a preamble in the lead of the frame of the first communication method, with regard to the reception signal of the antenna 110, for example, the synchronization unit 131 synchronizes the starting timing of the reception processing. The demodulation decoding unit 132 demodulates and decodes the reception signal in conformity with the arbitrary modulation method and encoding method used in the first communication method and obtains a data signal to be output to the control unit 140. The encoding modulation unit 133 encodes and modulates the data signal input from the control unit 140 in conformity with the arbitrary encoding method and modulation method used in the first communication method and generates a transmission signal to be output to the DA conversion unit 126.

While returning to FIG. 2, continuously, the configuration of the wireless communication apparatus 100 will be described.

The control unit 140 is composed, for example, by using a computation apparatus such as a micro processor and controls a general operation of the first wireless communication unit 120. For example, in accordance with a request from a predetermined application (such as a higher-level layer program of a communication protocol), the control unit 140 outputs the control signal for effecting the coordination in the second communication method such as the beacon to the first digital unit 130. Also, when the decoded control signal is input from the first digital unit 130, the control unit 140 obtains the information related to the coordination in the second communication method described in the relevant control signal or the like and appropriately stores this in the storage unit 150.

The storage unit 150 is composed, for example, of a writable recording medium such as a semiconductor memory and is used as a work memory for loading a program for executing a communication processing by the wireless communication apparatus 100 and storing various parameter values. Also, the storage unit 150 stores parameter values for identifying the optimal transmission and reception beam patterns at the time of the wireless communication in conformity with the second communication method by the second wireless communication unit 170.

The plurality of antennas 160a to 160n are used for the wireless communication in conformity with the second communication method. To be specific, the antennas 160a to 160n transmit the wireless signals weighted by using predetermined weighting coefficients respectively by using the millimeter waves. Also, the antennas 160a to 160n receive the wireless signals of the millimeter waves to be output to the second analog unit 172.

The second analog unit 172 is typically equivalent to an RF circuit for transmitting and receiving the wireless signal in conformity with the second communication method. That is, the second analog unit 172 performs the low noise amplification on the plurality of reception signals respectively received by the antennas 160a to 160n and also performs the down-conversion to be output to the AD conversion unit 174 in a later stage. Also, the second analog unit 172 performs the up-conversion on the plurality of transmission signals converted into the analog signals respectively by the DA conversion unit 176 to the FR band also performs the power amplification to be output to the respective antennas 160a to 160n.

The AD conversion unit 174 converts the plurality of analog reception signals input from the second analog unit 172 respectively into the digital signals to be output to the second digital unit 180 in a later stage. Also, the DA conversion unit 176 converts the plurality of digital transmission signals input from the second digital unit 180 respectively into the analog signals to be output to the second analog unit 172.

The second digital unit 180 is typically composed of a circuit for demodulating and decoding the reception signal in conformity with the second communication method and a circuit for encoding and modulating the transmission signal in conformity with the second communication method.

Figure 4:
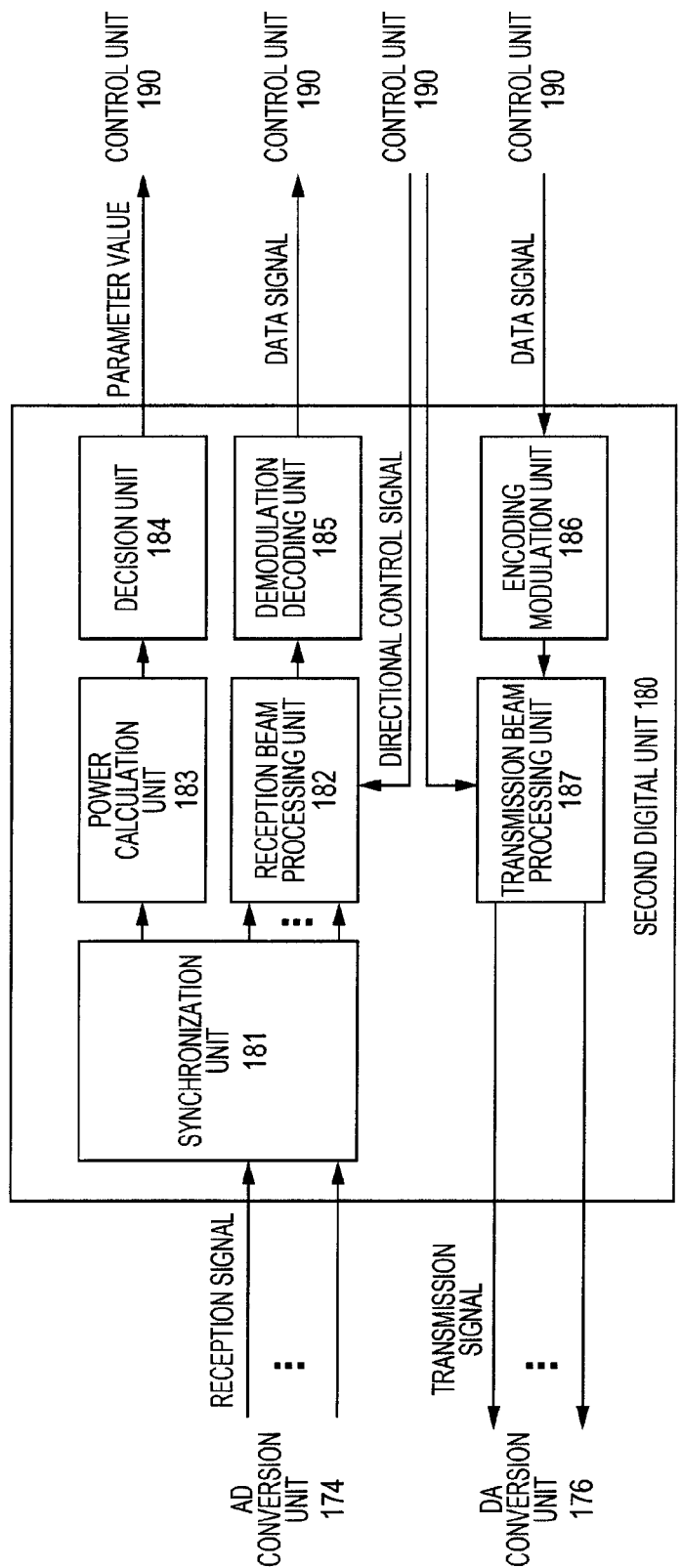
FIG. 4 illustrates an example of an internal configuration of a second digital unit 180.

FIG. 4 illustrates an example of an internal configuration of the second digital unit 180. As illustrated in the drawing, the second digital unit 180 is composed of a synchronization unit 181, a reception beam processing unit 182, a power calculation unit 183, a decision unit 184, a demodulation decoding unit 185, an encoding modulation unit 186, and a transmission beam processing unit 187.

For example, with regard to the plurality of reception signals received by the plurality of antennas 160a to 160n, the synchronization unit 181 synchronizes the starting timing of the reception processing in accordance with the preamble in the lead of the frame to be output to the reception beam processing unit 182.

With regard to the plurality of reception signals input from the synchronization unit 181, for example, the reception beam processing unit 182 performs a weighting processing in conformity with a uniform distribution or Taylor distribution to control the directivity of the reception beam. Then, the reception beam processing unit 182 outputs the weighted reception signal to the power calculation unit 183 and the demodulation decoding unit 185.

When a training on the optimal transmission and reception beam patterns is carried out (which will be described below), the power calculation unit 183 respectively calculates reception powers of the reception signals transmitted and received in the respective transmission and reception beam patterns to be sequentially output to the decision unit 184. Then, the decision unit 184 decides parameter values for identifying the optimal transmission beam pattern and reception beam pattern on the basis of the reception power values input from the power calculation unit 183. The optimal beam pattern typically refers to a beam pattern in which the series of the reception power values input from the power calculation unit 183 with regard to one beam training signal become maximum values.

The demodulation decoding unit 185 demodulates and decodes the reception signal weighted by the reception beam processing unit 182 in conformity with the arbitrary modulation method and encoding method used in the second communication method and obtains a data signal. Then, the demodulation decoding unit 185 outputs the obtained data signal to the control unit 190.

The encoding modulation unit 186 encodes and modulates the data signal input from the control unit 190 in conformity with the arbitrary encoding method and modulation method used in the second communication method and generates a transmission signal. Then, the encoding modulation unit 186 outputs the generated transmission signal to the transmission beam processing unit 187.

The transmission beam processing unit 187 generates a plurality of transmission signals weighted in conformity, for example, with the uniform distribution or Taylor distribution from the transmission signals input from the encoding modulation unit 186 and controls the directivity of the transmission beam. A value of the weight used by the transmission beam processing unit 187 is specified, for example, a directional control signal by input from the control unit 190. The transmission signals weighted by the transmission beam processing unit 187 are respectively output to the DA conversion unit 176.

While returning to FIG. 2, continuously, the configuration of the wireless communication apparatus 100 will be described.

The control unit 190 is composed, for example, by using a computation apparatus such as a micro processor and controls a general operation of the second wireless communication unit 170. Also, the control unit 190 obtains the parameter value for identifying the optimal transmission beam pattern from the storage unit 150 and outputs the directional control signal for forming the optimal transmission beam pattern identified on the basis of the relevant parameter value to the transmission beam processing unit 187 in the second digital unit 180. According to this, the transmission beam at the time of the wireless transmission in conformity with the second communication method by the wireless communication apparatus 100 is directed toward the direction in which the communication party is positioned.

Figure 5:
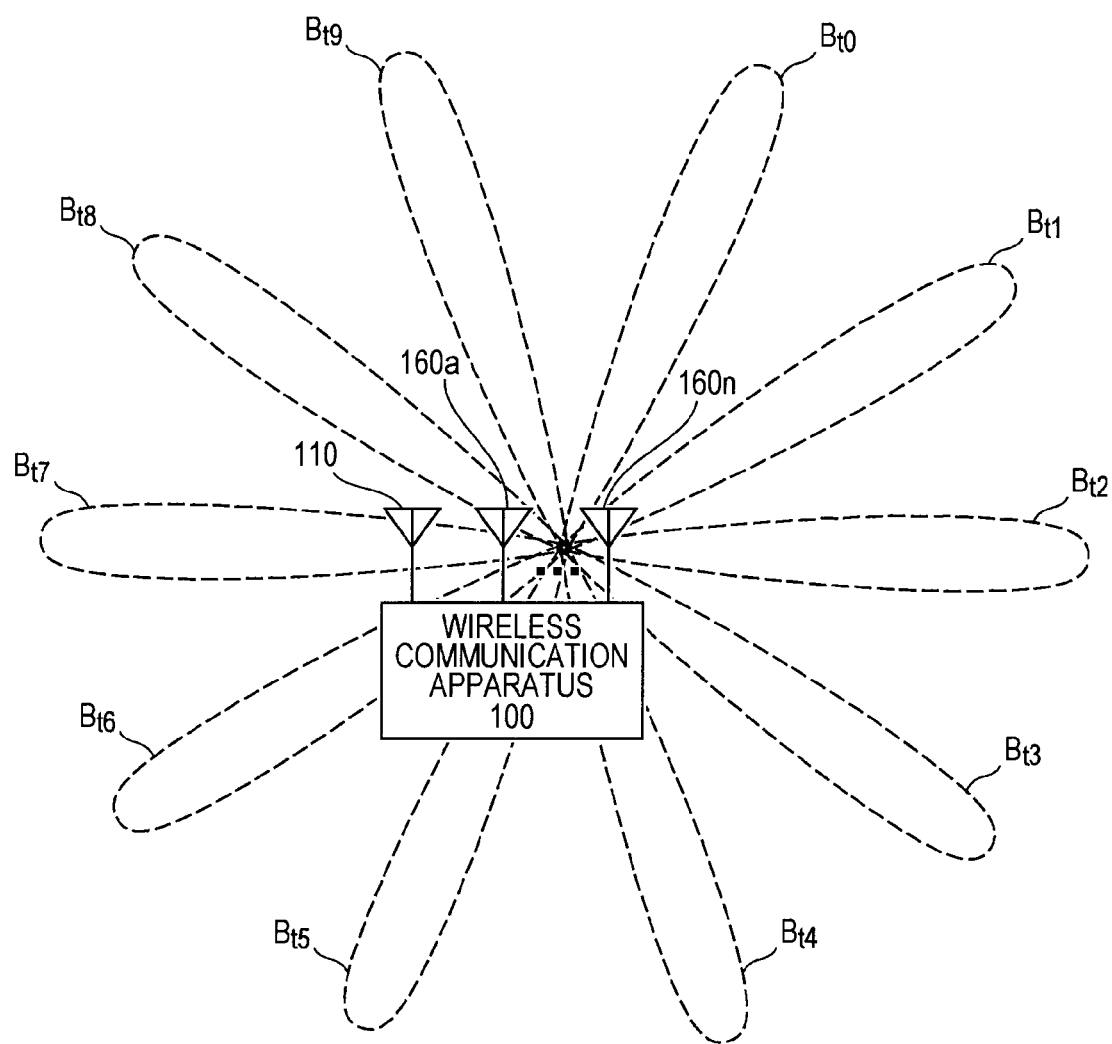
FIG. 5 illustrates an example of a transmission beam pattern that can be formed by the wireless communication apparatus 100 through a directivity control on a transmission beam by a transmission beam processing unit 185.

FIG. 5 illustrates an example of a transmission beam pattern that can be formed by the wireless communication apparatus 100 through a directivity control on the transmission beam by the transmission beam processing unit 187. In the example illustrated in the same drawing, the wireless communication apparatus 100 can form ten transmission beam patterns $B_{r0}$ to $B_{r9}$. The transmission beam patterns $B_{r0}$ to $B_{r9}$ respectively have the directivity toward directions different from one another by 36 degrees on a plane where the wireless communication apparatus 100 is positioned.

In accordance with the directional control signal from the control unit 190, by using one transmission beam pattern of the ten transmission beam patterns $B_{r0}$ to $B_{r9}$, the transmission beam processing unit 187 can transmit the directional wireless signal from the antennas 160a to 160n. Also, the reception beam patterns that can be formed by the wireless communication apparatus 100 may be beam patterns similar to the transmission beams • $B_{r0}$ to $B_{r9}$ illustrated in FIG. 5. That is, in accordance with the directional control signal from the control unit 190, while setting the reception beam pattern matched to any one (or a combination of two or more) of the above-mentioned ten pieces of reception beam patterns $B_{r0}$ to $B_{r9}$, the reception beam processing unit 182 can cause the wireless signal in conformity with the second communication method to be received by the antennas 160a to 160n. The storage unit 150 of the wireless communication apparatus 100 previously stores, for example, a weighting coefficient for each of the antennas 160a to 160n for respectively forming these transmission and reception beam patterns $B_{t0}$ to $B_{t9}$ and $B_{r0}$ to $B_{r9}$.

It should be noted that that the transmission beam pattern and the reception beam pattern can be formed by the wireless communication apparatus 100 are not limited to the examples illustrated in FIG. 5. For example, the plurality of antennas 160a to 160n can also be configured so that it is possible to form the transmission beam patterns or the reception beam patterns having the directivity in various directions on a three dimensional space.

The wireless communication apparatus 100 uses the first wireless communication unit 120 that performs the wireless communication by using the micro waves and the second wireless communication unit 170 that performs the wireless communication by using the millimeter waves in combination. To be specific, the control signal for effecting the coordination in the second communication method such as the beacon is transmitted and received by the first wireless communication unit 120 and the antenna 110, and after the coordination is effected, the transmission and the reception are carried out by the second wireless communication unit 170 and the plurality of antennas 160a to 160n.

Subsequently, a description will be given of an embodiment illustrated in FIG. 6 to which the present invention is applied. The communication system illustrated in the drawing is an infrastructure network composed of a single access point (AP) and two terminal stations (STA1 and STA2). Each of these three communication stations (AP, STA1, and STA2) is set to be configured by using the wireless communication apparatus 100 illustrated in FIG. 2.

These three communication stations (AP, STA1, and STA2) are set to exist at locations to have communication distances where the wireless signal in conformity with the first communication method reaches but the wireless signal in conformity with the second communication method does not reach unless the transmission and reception beams are directed. In the example illustrated in FIG. 6, the transmission and reception beams of the second wireless communication unit 170 of the respective terminal stations (STA1 and STA2) are both directed toward the access point (AP) side, the respective terminal stations (STA1 and STA2) both establish the communication link based on the second communication method with the access point (AP), which can be utilized as a link for the high speed data transmission between the access point (AP) and the respective terminal stations (STA1 and STA2). Of course, the communication link based on the first communication method between the access point (AP) and the respective terminal stations (STA1 and STA2) is valid and can be utilized as the link for the coordination.

On the other hand, as the transmission and reception beams are not directed, between the terminal stations STA1 and STA2, the communication link based on the second communication method is invalid, in other words, the link for the high speed data transmission between the terminal stations STA1 and STA2 is not established. Also, the communication link based on the first communication method between the terminal stations STA1 and STA2 is valid and can be utilized as the communication link for the coordination in an auxiliary manner.

The access point (AP) periodically transmits a beacon in which operational information on a basic service set to which its own station belongs (Basic Service Set: BSS) is described in conformity with the first communication method. A period in which the beacon is transmitted is referred to as "frame period". The beacon is a control signal to effect the coordination between the respective terminal stations (STA1 and STA2).

According to the present embodiment, in the beacon transmitted in conformity with the first communication method, BSS operational information at the time of the communication in conformity with the second communication method is also described together with the BSS operational information at the time of the communication in conformity with the first communication method. Therefore, the respective terminal stations (STA1 and STA2) receive the beacon from the access point (AP) and in conformity with the described BSS operational information, the communication operation can be carried out in both the first communication method and the second communication method in the relevant BBS. That is, the access point (AP) can effect the coordination in the wireless communication in conformity with the second communication method by utilizing the first communication method in an auxiliary manner.

Figure 7:
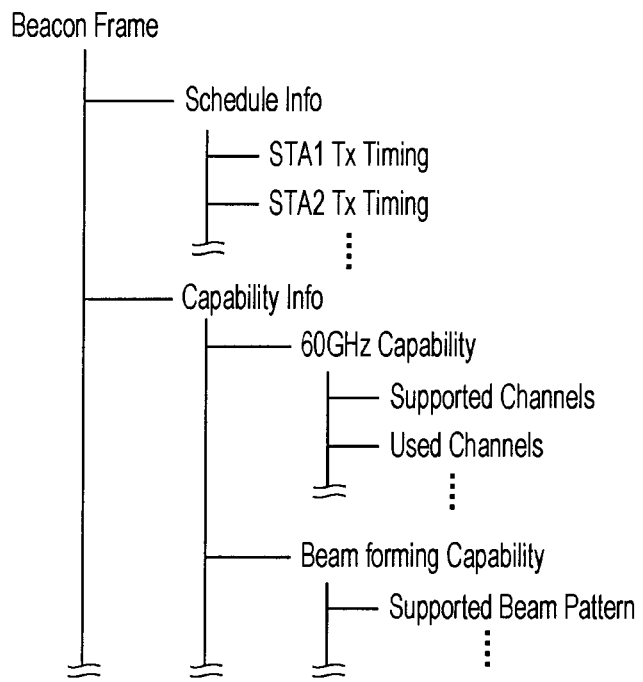
FIG. 7 exemplifies operation information of BSS at the time of a communication in conformity with a second communication method which is described in a beacon.

FIG. 7 exemplifies operational information of BSS at the time of a communication in conformity with a second communication method which is described in beacon. As illustrated in the drawing, as the operational information, schedule information (Schedule Info) such as the transmission timings in the second communication method (STA1 Tx Timing, STA2 Tx Timing, . . . ) allocated to the respective terminal stations (STA1 and STA2) in the frame period, information related to a communication capability of the access point (AP) itself or the relevant BSS in the second communication method (Capability Info), and the like are exemplified. The communication capability (Capability Info) information referred herein includes communication capability information related to a use frequency band (60 GHz Capability), performance information related to the beam formation by the access point (AP) itself (Beamforming Capability), and the like. As the communication capability information related to the use frequency band (60 GHz Capability), channels supported by the access point (AP) (Supported Channels), (it should be noted however that a case in which a plurality of channels are allocated to the 60 GHz band), channels currently used by the relevant BSS (that is, utilizable) (Used Channels), and the like are described. Also, as capability information related to a beam formation (Beamforming Capability), information related to the transmission and reception beam patterns supported by the access point (AP) (see FIG. 5) (Supported Beam Pattern), and the like are described.

In a case where the BSS operational information at the time of the communication in conformity with the second communication method is also described in the beacon transmitted in conformity with the first communication method in this manner, an advantage exists that the access point (AP) can convey information indicating that a communication party exists before the directivity is established by utilizing the first communication method in an auxiliary manner to the respective terminal stations (STA1 and STA2) where the wireless signal in conformity with the second communication method does not reach unless the directivity of the transmission and reception beams is established. On the other hand, when the access point (AP) attempts to convey the BSS operational information in the second communication method to the respective terminal stations (STA1 and STA2) in conformity with the second communication method, as the wireless signal reaches only in the direction to which the transmission and reception beams is directed, it is necessary to transmit the same information to the respective terminal stations located in separate directions, and the overhead becomes large.

It should be noted that the BSS operational information at the time of the communication in conformity with the first communication method which is described in the beacon is similar to the described content of the beacon regulated, for example, by IEEE802.11 utilizing the micro waves or the like, and a detailed description will be omitted in the present specification.

In the wireless communication, occurrence of a hiding terminal problem that an area where the communication stations cannot mutually directly communicate exists is known. In the wireless communication system illustrated in FIG. 6 too, when the data transmission in the second communication method is carried out by utilizing the respective transmission intervals allocated from the access point through the beacon (STA1 Tx Timing and STA2 Tx Timing), the respective terminal stations (STA1 and STA2) apply an RTS/CTS hand shaking procedure to avoid a collision.

In an RTS/CTS method, the communication station of the data transmission origin transmits a transmission start request frame RTS (Request To Send), and in response to reception of a confirmation notification frame CTS (Clear To Send) from the communication station of the data transmission destination, transmission of a data frame is started. At this time, the hiding terminal for the data transmission side (RTS transmission station) receives the CTS and sets a transmission stop time period (NAV: Network Allocation Vector) to avoid a collision with the data frame. Also, the hiding terminal for the data reception side (CTS transmission station) receives the RTS and sets the transmission stop time period to avoid a collision with the ACK replied to the data frame reception.

Figure 6:
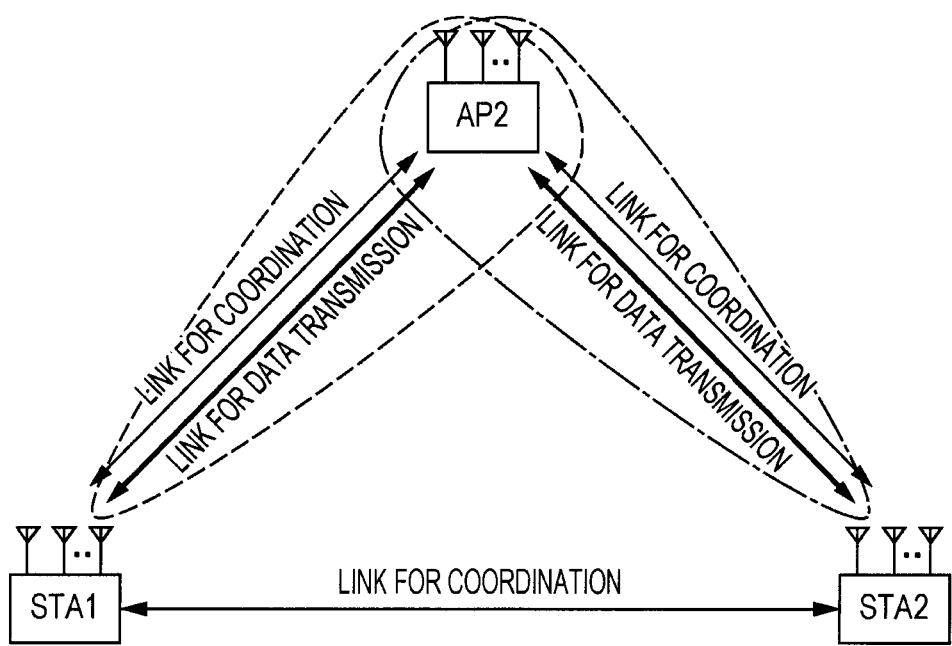
FIG. 6 illustrates an embodiment in which the present invention is applied to a wireless communication system of an infra structure mode.
Figure 8:
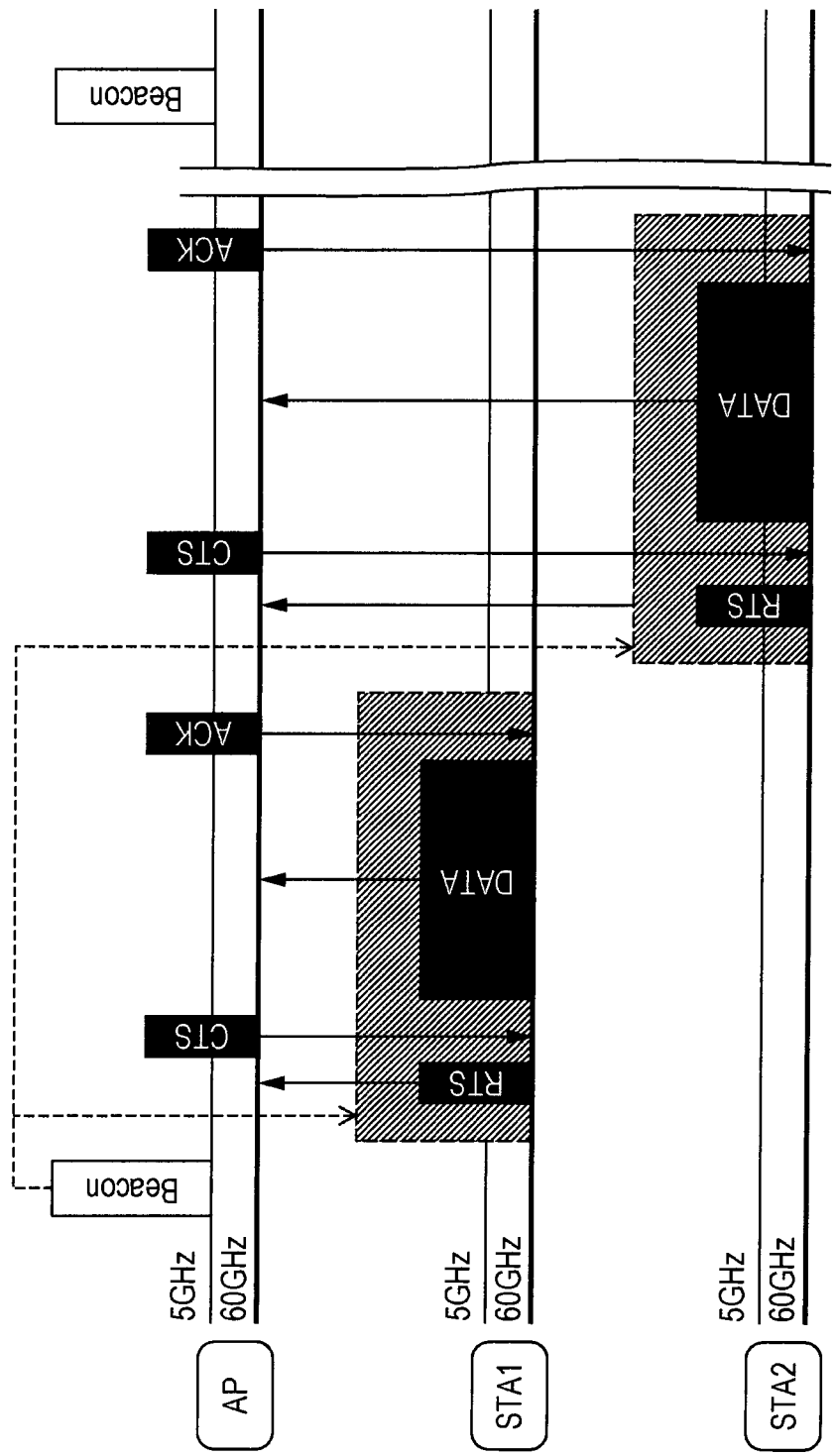
FIG. 8 illustrates an example of a signal transmission reception sequence carried out by utilizing an RTS/CTS method in the wireless communication system illustrated in FIG. 6.

FIG. 8 illustrates an example of a signal transmission reception sequence carried out by utilizing the RTS/CTS method in the wireless communication system illustrated in FIG. 6. It should be noted however that in the same drawing, it is assumed that the access point (AP) and the respective terminal stations (STA1 and STA2) both finish the training on the optimal directivity for the antennas 160-*a*, . . . , 160-*n*.

For every predetermined frame period, the access point (AP) reports the beacon in conformity with the first communication method of the 5 GHz band, and the respective terminal stations (STA1 and STA2) receive this beacon to be put under the control of the access point (AP) to effect the coordination with regard to the first communication method in the BSS and also the coordination with regard to the second communication method of the 60 GHz band.

In the beacon, as the BSS operational information at the time of the communication in conformity with the second communication method, the schedule information (Schedule Info) allocated to the respective terminal stations (STA1 and STA2) such as the transmission timings in the second communication method (STA1 Tx Timing, STA2 Tx Timing, . . . ) is described (as described above and see FIG. 7). In the example illustrated in FIG. 8, in conformity with the schedule information described in the beacon, within the frame period, an interval represented by left diagonal lines is allocated to the transmission interval in conformity with the second communication method of one terminal station (STA1), and also an interval represented by right diagonal lines is allocated to the transmission interval in conformity with the second communication method of the other terminal station (STA2). The terminal stations (STA1 and STA2) can perform the wireless communication in conformity with the second communication method on contention-free.

As the terminal station (STA1) and the terminal station (STA2) do not direct the transmission and reception beams to each other and the control frames such as the RTS and the CTS transmitted in conformity with the second communication method do not reach, the NAV cannot be set in the other terminal station with the mutual RTS and CTS. However, as illustrated in FIG. 8, as the transmission intervals are individually allocated to the terminal station (STA1) and the terminal station (STA2), the mutual wireless signals in conformity with the second communication method do not collide with each other.

Since the coordination is effected, the terminal station (STA1) and the terminal station (STA2) can perform the communication operation in conformity with the second communication method. In the example illustrated in FIG. 8, in the transmission interval allocated to itself (left diagonal line section), the terminal station (STA1) executes the RTS/CTS hand shaking procedure in conformity with the second communication method with the access point (AP).

When the transmission interval allocated to itself enters, first, the terminal station (STA1) confirms that the media is clear only by a certain period of time through the CSMA procedure, and after that, transmits the RTS toward the access point (AP) in conformity with the second communication method.

On the other hand, when the starting time of the transmission interval allocated to the terminal station (STA1) arrives, in preparation to the wireless communication in conformity with the second communication method with the terminal station (STA1), the access point (AP) controls the directivity of the second wireless communication unit 170 so that the transmission and reception beam patterns become optimal to the terminal station (STA1) and starts the reception operation. Then, in response to the reception of the RTS, after a predetermined frame space SIFS (Short Inter Frame Space) elapses, the access point (AP) replies the CTS for feeding back the status that the RTS has been successfully received in conformity with the second communication method.

Then, when it is confirmed that the media is clear through the reception of the CTS without incident, after the SIFS elapses, the terminal station (STA1) transmits the data frame in conformity with the second communication method. It should be noted that although not illustrated in the drawing, in synchronization with the data frame in conformity with the second communication method, the terminal station (STA1) may also perform the transmission of the data frame based on the first communication method in parallel.

After the CTS is transmitted, the access point (AP) stands by for the data frame. Then, when the reception of the data frame is ended without incident, after the SIFS elapses, the ACK is replied. Through the reception of the ACK, the terminal station (STA1) recognizes that the series of RTS/CTS hand shaking procedure is completed without incident.

Similarly, in the transmission interval allocated to itself (right diagonal section), the terminal station (STA2) executes the RTS/CTS hand shaking procedure in conformity with the second communication method with the access point (AP).

When the transmission interval allocated to itself enters, first, the terminal station (STA2) confirms that the media is clear only by a certain period of time through the CSMA procedure, and after that transmits the RTS to the access point (AP).

On the other hand, when the starting time of the transmission interval allocated to the terminal station (STA2) arrives, in preparation to the wireless communication in conformity with the second communication method with the terminal station (STA2), the access point (AP) controls the directivity of the second wireless communication unit 170 so that the transmission and reception beam patterns become optimal to the terminal station (STA2) and starts the reception operation. Then, in response to the reception of the RTS, after the predetermined frame interval SIFS elapses, the access point (AP) replies the CTS for feeding back the status that the RTS has been successfully received.

Then, when it is confirmed that the media is clear through the reception of the CTS without incident, after the SIFS elapses, the terminal station (STA2) transmits the data frame. It should be noted that although not illustrated in the drawing, in synchronization with the data frame in conformity with the second communication method, the terminal station (STA2) may also perform the transmission of the data frame based on the first communication method in parallel.

After the CTS is transmitted, the access point (AP) stands by for the data frame. Then, when the reception of the data frame is ended without incident, after the SIFS elapses, the ACK is replied. Through the reception of the ACK, the terminal station (STA2) recognizes that the series of RTS/CTS hand shaking procedure is completed without incident.

In the above, while it is supposed that the training on the directivity of the transmission and reception beam patterns of the respective communication stations is ended, the signal transmission reception sequence illustrated in FIG. 8 has been described. Here, an example of a training method for the optimal transmission and reception beam patterns will be described. It should be noted however that the gist of the present invention is not limited to the particular training method.

Figure 9:
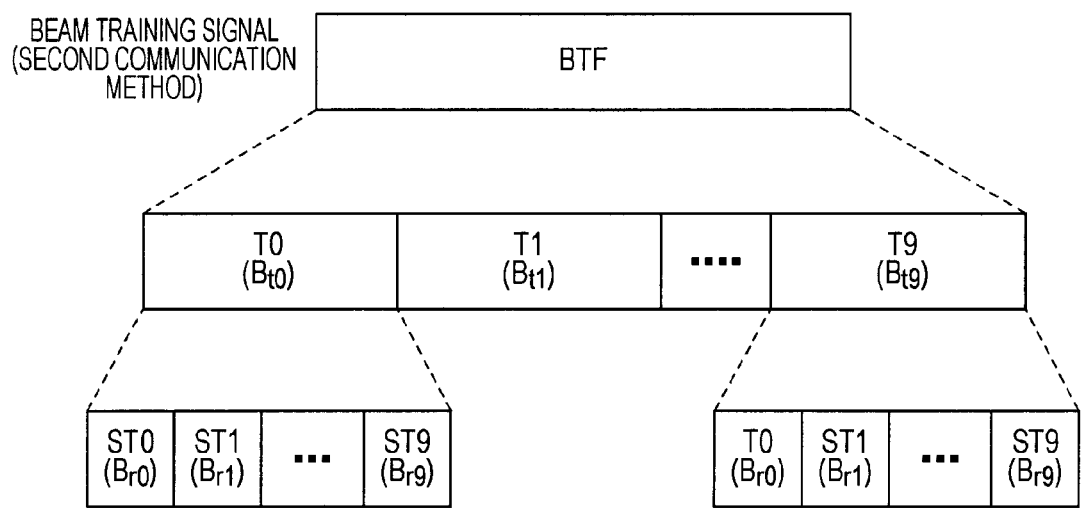
FIG. 9 illustrates an example of a signal format of a beam training signal used for beam training by a communication party.

FIG. 9 illustrates an example of a signal format of the beam training signal used for beam training by the communication party which is transmitted from the wireless communication apparatus 100. It should be noted however that in the same drawing, a description on a header section is omitted. A beam training signal BTF (Beam Training Field) illustrated in the drawing is transmitted from the plurality of antennas 160a to 160n in conformity with the second communication method. A training signal sequence placed on the beam training signal BTF may be, for example, a random pattern of BPSK (Binary Phase Shift Keying) or the like.

The beam training signal illustrated in the drawing is obtained by multiplexing the training signal sequence for each of the transmission beam patterns $B_{t0}$ to $B_{t9}$ through time division. The beam training signal BTF is composed of ten time slots T0 to T9 corresponding to the respective transmission beam patterns $B_{t0}$ to $B_{t9}$ illustrated in FIG. 5. Then, in the respective time slots T0 to T9, ten ways of the training signal sequences obtained by respectively weighting the predetermined known signal sequences by the weighting coefficients for forming the respective transmission beam patterns $B_{t0}$ to $B_{t9}$ are sequentially transmitted. Therefore, the directivity of the transmission beam of the beam training signal sequentially changes like the transmission beam patterns $B_{t0}$ to $B_{t9}$ illustrated in FIG. 5 for each of the time slots T0 to T9.

On the reception side where this beam training signal BTF is received, the power level of the reception signal for each of the time slots T0 to T9 the beam training signal BTF (that is, for every training signal sequence) is observed. As a result, the power level of the reception signal has an outstanding value in any one of the time slots of the beam training signal BTF. The time slot when the power level of the reception signal becomes the peak changes in accordance with a relative position with respect to the transmission side where the beam training signal BTF is transmitted. Then, the transmission beam pattern relevant to the time slot when the reception power level becomes the peak can be decided as the transmission beam pattern that is also optimal to the transmission side.

Also, on the reception side of the beam training signal BTF too, it is configured that the ten reception beam patterns $B_{r0}$ to $B_{r9}$ can be formed like the transmission beam patterns $B_{t0}$ to $B_{t9}$ illustrated in FIG. 5. Then, the respective time slots T0 to T9 of the beam training signal BTF are further divided respectively into 10 pieces of small intervals ST0 to ST9, and a weighting processing is carried out on the reception signal in ten ways of the reception beam patterns $B_{r0}$ to $B_{r9}$ mutually different in the respective small intervals ST0 to ST9. In the example illustrated in FIG. 9, the first small interval ST0 in the time slot T0 is associated with the reception beam pattern $B_{r0}$, the second small interval ST1 in the time slot T0 is associated with the reception beam pattern $B_{r1}$, . . . , the first small interval ST0 in the time slot T9 is associated with the reception beam pattern $B_{r0}$, . . . , etc. Through the above-mentioned directivity control processing on the reception beam, in one beam training signal BTF, it is possible to obtain the reception signals transmitted and received in the ten ways of the transmission beam patterns×the ten ways of the reception beam patterns=the total 100 ways of the transmission and reception beam patterns.

The power calculation unit 183 illustrated in FIG. 4 respectively calculates reception powers of the reception signals transmitted and received in the above-mentioned total 100 ways of the transmission reception patterns to be sequentially output to the decision unit 184. Then, on the basis of the input reception power values, the decision unit 184 decides parameter values for identifying the optimal transmission beam pattern and reception beam pattern. The optimal beam pattern typically refers to a beam pattern in which the series of the reception power values input from a power calculation unit 283 become maximum values with respect to one beam training signal. The parameter value for identifying the optimal transmission beam pattern may be, for example, any one of the time slot numbers (T0 to T9) of the beam training signal BTF. Also, the parameter value for identifying the optimal reception beam pattern may be, for example, the small interval number (ST0 to ST9) illustrated in FIG. 9. The decision unit 184 outputs the thus decided parameter value to the control unit 190. Also, the parameter value (T0 to T9) for identifying the optimal transmission beam pattern may be fed back to the transmission side of the beam training signal BTF. It should be noted however that this feedback procedure is not directly associated with the gist of the present invention, and therefore the description is omitted in the present specification.

Even when the training on the optimal transmission and reception beam patterns is mutually carried out between the communication stations that become the communication parties, and thereafter, if the terminal station is moved or a shielding material enters onto the communication path, though temporarily, the transmission and reception beam patterns that could be utilized up to the previous time cannot be utilized, and the directional communication link is invalidated.

For this reason, the inventors of the present invention propose an adoption of a "link maintenance" proceeding for checking, in prior to the data communication in conformity with the second communication method, whether or not the transmission and reception beam patterns that were utilized in the previous time can be utilized, that is, whether or not the directional communication link is valid every certain time period. To be specific, between the communication stations where the directional communication link is established, the link maintenance frames for the link maintenance are exchanged in conformity with the second communication method, and it is possible to check on the validity of the directional communication link in the previous time depending on whether the mutual frames can be received. To realize the above-mentioned link maintenance proceeding, it is necessary to decide a time when the maintenance is executed, that is, a timing when the communication party transmits the link maintenance frame in advance. For a notification of the transmission timing for the link maintenance frame, the first communication method which is nondirectional and has no flying distance problems can be utilized in an auxiliary manner.

In the signal transmission reception sequence illustrated in FIG. 8, the access point (AP) individually allocates the transmission intervals to the respective terminal stations (STA1 and STA2), and the respective terminal stations (STA1 and STA2) are adapted to utilize the RTS/CTS hand shaking procedure in the respective transmission intervals to perform the data transmission to the access point (AP). In this case, for the access point (AP), timings when the respective terminal stations (STA1 and STA2) transmit the RTS are already known, and for the respective terminal stations (STA1 and STA2), a timing when the CTS is replied from the access point (AP) is already known. Therefore, the respective control frames of the RTS and the CTS can be employed the link maintenance frame. It should be noted however that in the respective transmission intervals, even in a case where the transmission data to the access point (AP) does not exist, the terminal stations (STA1 and STA2) is adapted to transmit the RTS doubling as the link maintenance frame by necessity.

Figure 10:
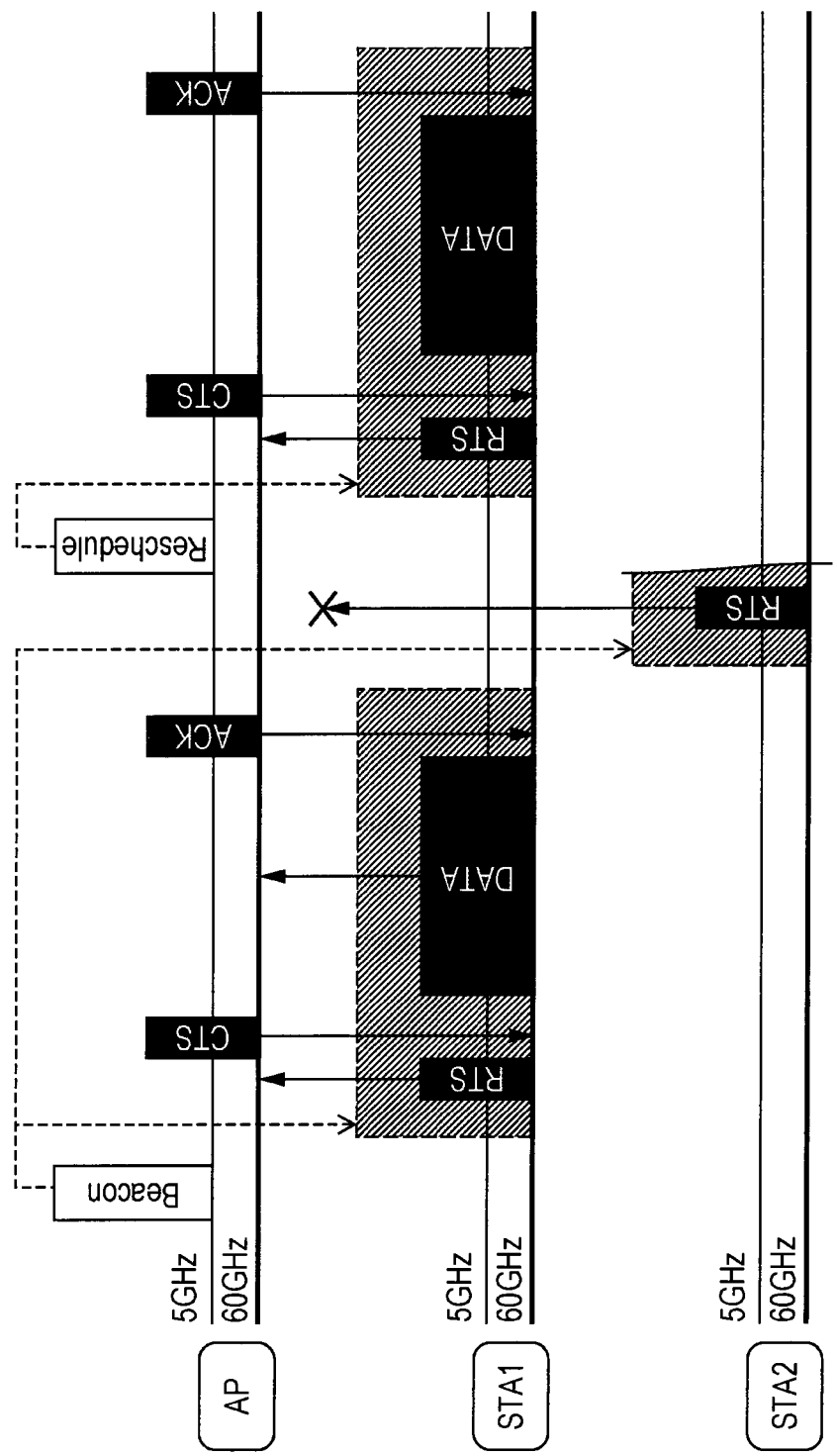
FIG. 10 illustrates an example of a signal transmission reception sequence where a link maintenance is carried out by utilizing an RTS/CTS hand shaking procedure.

FIG. 10 illustrates an example of the signal transmission reception sequence where the link maintenance is carried out by utilizing the RTS/CTS hand shaking procedure. It should be noted however that in the signal transmission reception sequence illustrated in the drawing, it is assumed that the frame period of the beacon is already established between the access point (AP) and the respective terminal stations (STA1 and STA2). Also, the access point (AP) is adapted to reschedule the allocation of the transmission interval of the frame period while excluding the directional communication link that is invalidated.

For every predetermined frame period, the access point (AP) reports the beacon in conformity with the first communication method of the 5 GHz band to effect the coordination with regard to the second communication method in the 60 GHz band. Then, through the beacon, the transmission intervals in conformity with the second communication method are respectively allocated to the respective terminal stations (STA1 and STA2).

Toward the access point (AP) after a predetermined time period elapses from the leading of the transmission interval allocated to itself, the terminal station (STA1) transmits the RTS doubling as the link maintenance frame in conformity with the second communication method in which the directional communication link that was utilized in the previous time is utilized again. It should be noted however that the terminal station (STA1) transmits the RTS by necessity for the link maintenance in the transmission interval of itself even in a case where the transmission data to the access point (AP) does not exist.

On the other hand, as the RTS from the terminal station (STA1) in the transmission interval allocated to the terminal station (STA1) in conformity with the second communication method in which the directional communication link that was utilized in the previous time is utilized again is received, the access point (AP) can confirm that the directional communication link that was utilized in the previous time with the terminal station (STA1) is valid. Here, through a hand shake of the RTS, the access point (AP) may be adapted to update a state of the directional communication link (the optimal reception beam pattern). Then, after the predetermined frame interval SIFS elapses since the RTS is received, the access point (AP) replies the CTS doubling as the link maintenance frame in conformity with the second communication method.

As the CTS is received, the terminal station (STA1) can confirm that the media is clear and also the directional communication link that was utilized in the previous time with the access point (AP) is valid. Here, through the hand shaking of the CTS, the terminal station (STA1) may be adapted to update the state of the directional communication link (the optimal reception beam pattern).

Then, after the SIFS elapses since the reception of the CTS, the terminal station (STA1) the data frame in conformity with the second communication method in which the directional communication link that was utilized in the previous time is utilized again. Also, when the reception of the data frame is ended without incident, the access point (AP) replies the ACK. Through the reception of the ACK, the terminal station (STA1) recognizes that the series of RTS/CTS hand shaking procedure is completed without incident.

Also, toward the access point (AP) after the predetermined time period elapses from the leading of the transmission interval allocated to itself, the terminal station (STA2) transmits the RTS doubling as the link maintenance frame in conformity with the second communication method in which the directional communication link that was utilized in the previous time is utilized again RTS. It should be noted however that the terminal station (STA2) transmits the RTS by necessity for the link maintenance in the transmission interval of itself even in a case where the transmission data to the access point (AP) does not exist.

However, in the transmission interval allocated to the terminal station (STA2), as the RTS from the terminal station (STA2) cannot be received at an expected time in conformity with the second communication method in which the directional communication link that was utilized in the previous time is utilized again, the access point (AP) can recognize that the directional communication link that was utilized in the previous time with the terminal station (STA2) is invalidated.

In such a case, while excluding the transmission interval to the terminal station (STA2) where the directional communication link becomes invalid, the access point (AP) reschedules the allocation of the transmission interval of the frame period. Then, the access point (AP) reports a Reschedule frame in which a rescheduled content is described in conformity with the first communication method.

The terminal station (STA1) can receive the Reschedule frame in conformity with the first communication method. By analyzing the description content in the same frame, the terminal station (STA1) can recognize a timing of the transmission interval newly allocated to itself. Then, similarly as described above, toward the access point (AP) after the predetermined time period elapses from the leading of the transmission interval allocated to itself, the terminal station (STA1) may transmit the RTS doubling as the link maintenance frame in conformity with the second communication method.

Figure 11:
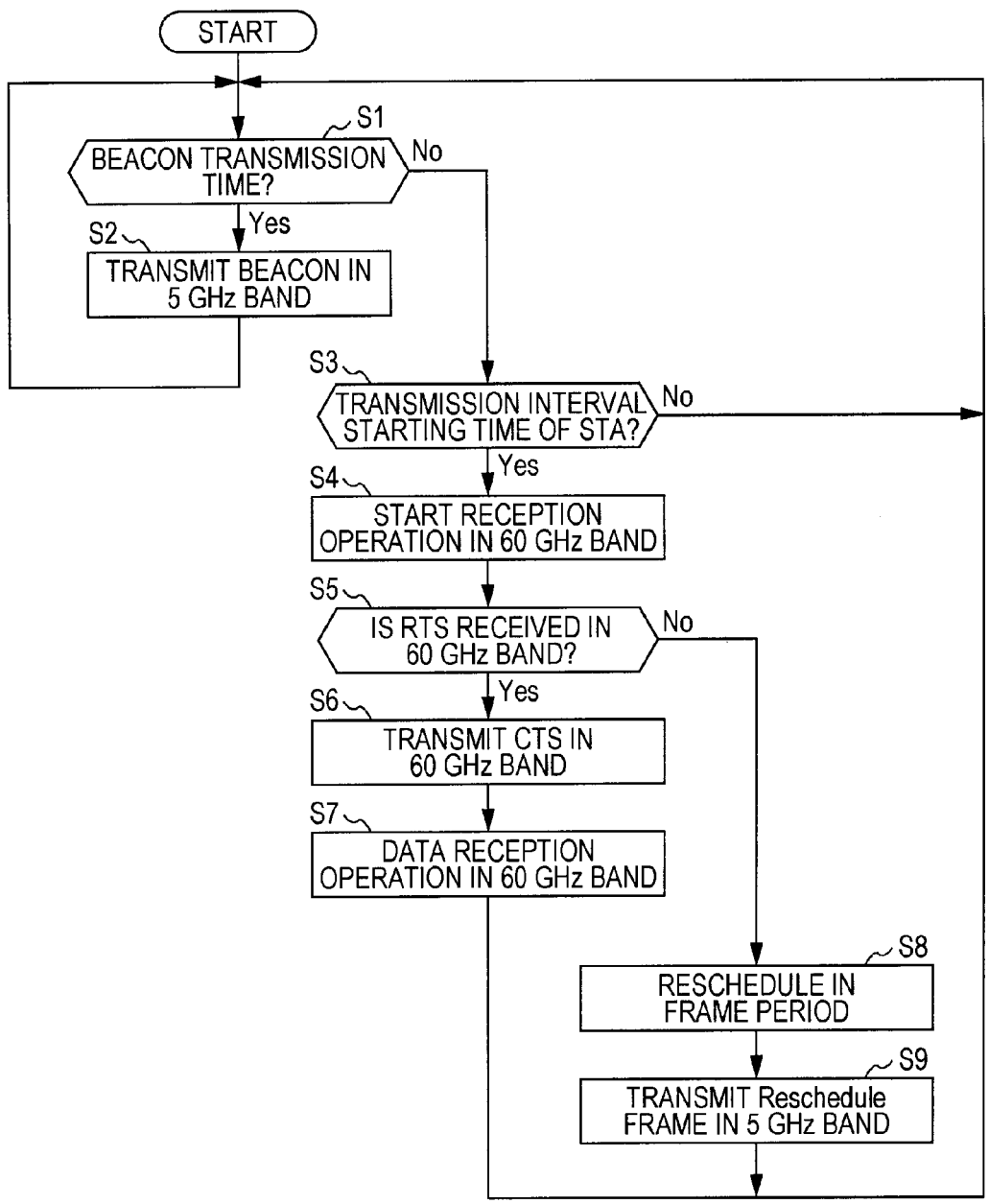
FIG. 11 is a flow chart illustrating a processing procedure for realizing the signal transmission reception sequence illustrated in FIG. 10 by an access point (AP).

FIG. 11 illustrates a processing procedure for realizing the signal transmission reception sequence illustrated in FIG. 10 by the access point (AP) in a flow chart format.

When the beacon transmission time for every frame period comes (Yes in step S1), in conformity with the 5 GHz, that is, the first communication method, the access point (AP) transmits the beacon (step S2). In the beacon, the BSS operational information at the time of the communication in conformity with the first communication method and the BSS operational information at the time of the communication in conformity with the second communication method are described, and as the peripheral respective terminal stations receive the beacon, the coordination in the BSS is effected. Also, as the BSS operational information at the time of the communication in conformity with the second communication method, the transmission interval allocated to the respective terminal stations within the frame period is described.

When the starting time of the transmission interval allocated to any one of the terminal stations (STA) in the frame period arrives (Yes in step S3), the access point (AP) controls the directivity of the second wireless communication unit 170 so that the transmission and reception beam patterns become optimal to the terminal station (STAT) and starts the reception operation in conformity with the 60 GHz band, that is, the second communication method (step S4).

Here, when the RTS doubling as the link maintenance frame can be received from the terminal station (STA) at an expected time (Yes in step S5), the access point (AP) can confirm that the directional communication link that was utilized in the previous time with the terminal station (STA) is valid. Here, through the hand shake of the RTS, the access point (AP) may be adapted to update the state of the directional communication link (the optimal reception beam pattern).

Then, after the predetermined frame interval SIFS elapses since the RTS is received, in conformity with the second communication method in which the directional communication link that was utilized in the previous time is utilized again, the access point (AP) replies the CTS doubling as the link maintenance frame (step S6) and also receives the data frame from the terminal station (STA) (step S7). Also, the access point (AP) replies the ACK when the reception of the data frame is ended without incident.

On the other hand, when the RTS doubling as the link maintenance frame cannot be received from the terminal station (STA) at an expected time in conformity with the second communication method in which the directional communication link that was utilized in the previous time is utilized again (No in step S5), the access point (AP) can recognize that the directional communication link that was utilized in the previous time with the terminal station (STA) is invalidated.

In such a case, the access point (AP) reschedules the allocation of the transmission interval of the frame period while excluding the transmission interval to the terminal station (STA2) where the directional communication link becomes invalid (step S8). It should be noted however that the gist of the present invention is not limited to a particular reschedule processing, and therefore a description on the reschedule processing will be omitted herein.

Then, the access point (AP) reports the Reschedule frame in which the rescheduled content is described in conformity with the first communication method that has no flying distance problems (step S9).

Figure 12:
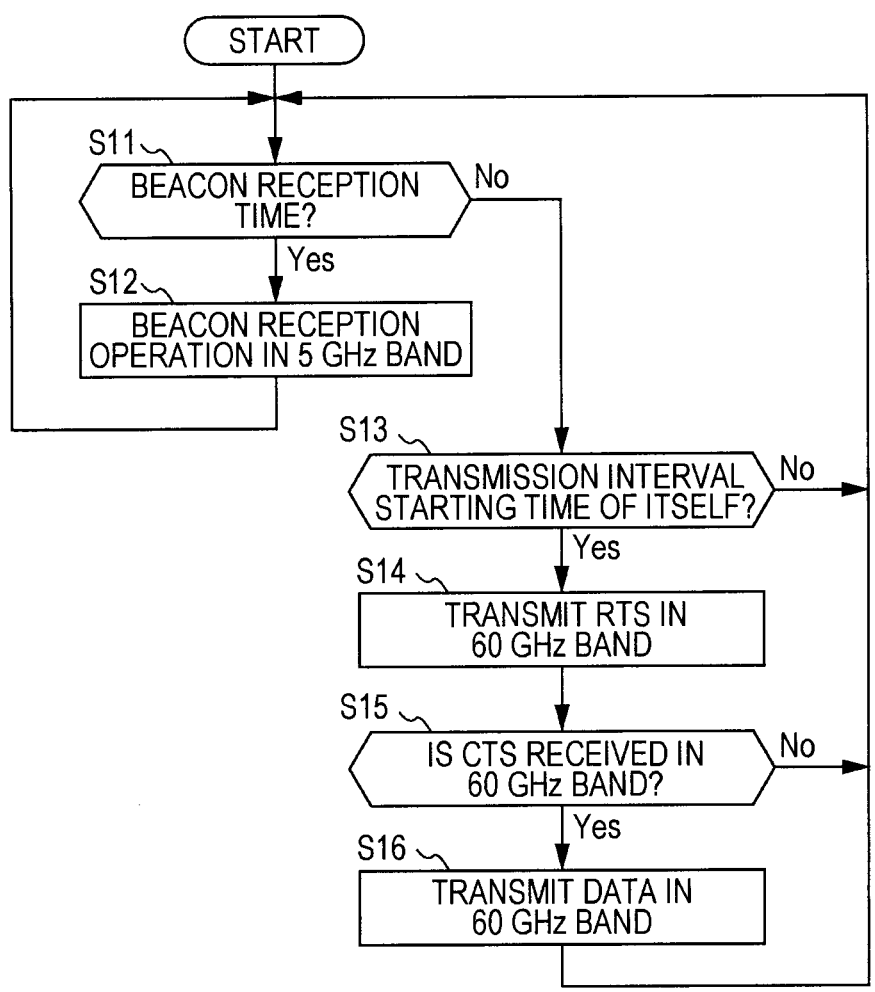
FIG. 12 is a flow chart illustrating a processing procedure for realizing the signal transmission reception sequence illustrated in FIG. 10 by terminal stations (STA1 and STA2).

FIG. 12 illustrates a processing procedure for realizing the signal transmission reception sequence illustrated in FIG. 10 by the terminal stations (STA1 and STA2) in a flow chart format.

When the beacon reception time for every frame period comes (Yes in step S11), the terminal station (STA) starts the reception operation in conformity with the 5 GHz, that is, the first communication method and receives the beacon from the access point (AP) (step S12). In the beacon, the BSS operational information at the time of the communication in conformity with the first communication method and also the BSS operational information at the time of the communication in conformity with the second communication method are described, and the terminal station (STA) can recognize the transmission interval allocated to itself within the frame period. It should be noted that the terminal station (STA) may recognize the transmission interval allocated to itself through the reception of the Reschedule frame (as described above) in addition to the operational information described in the beacon.

When the transmission interval of itself notified by the beacon or the Reschedule frame enters, after a predetermined time period elapses from the leading (Yes in step S13), toward the access point (AP), the terminal station (STA) transmits the RTS doubling as the link maintenance frame in conformity with the second communication method in which the directional communication link that was utilized in the previous time is utilized again (step S14). It should be noted however that the terminal station (STA) transmits the RTS by necessity for the link maintenance in the transmission interval of itself, even in a case where the transmission data to the access point (AP) does not exist.

After the RTS is transmitted, the terminal station (STA) stands by for the reception of the CTS from the access point (AP). Then, through the reception of CTS in conformity with the second communication method in which the directional communication link that was utilized in the previous time is utilized again (Yes in step S15), the terminal station (STA) can confirm that the directional communication link that was utilized in the previous time with the access point (AP) is valid. Here, through the hand shaking of the CTS, the terminal station (STA1) may be adapted to update the state of the directional communication link (the optimal reception beam pattern).

Also, the terminal station (STA) confirms that the media is clear through the reception of the CTS (Yes in step S15). Then, after the SIFS elapses since the reception of the CTS, the terminal station (STA) transmits the data frame in conformity with the second communication method in which the directional communication link that was utilized in the previous time is utilized again (step S16). After that, as the ACK is received, the terminal station (STA) recognizes that the series of RTS/CTS hand shaking procedure is completed without incident.

Figure 13:
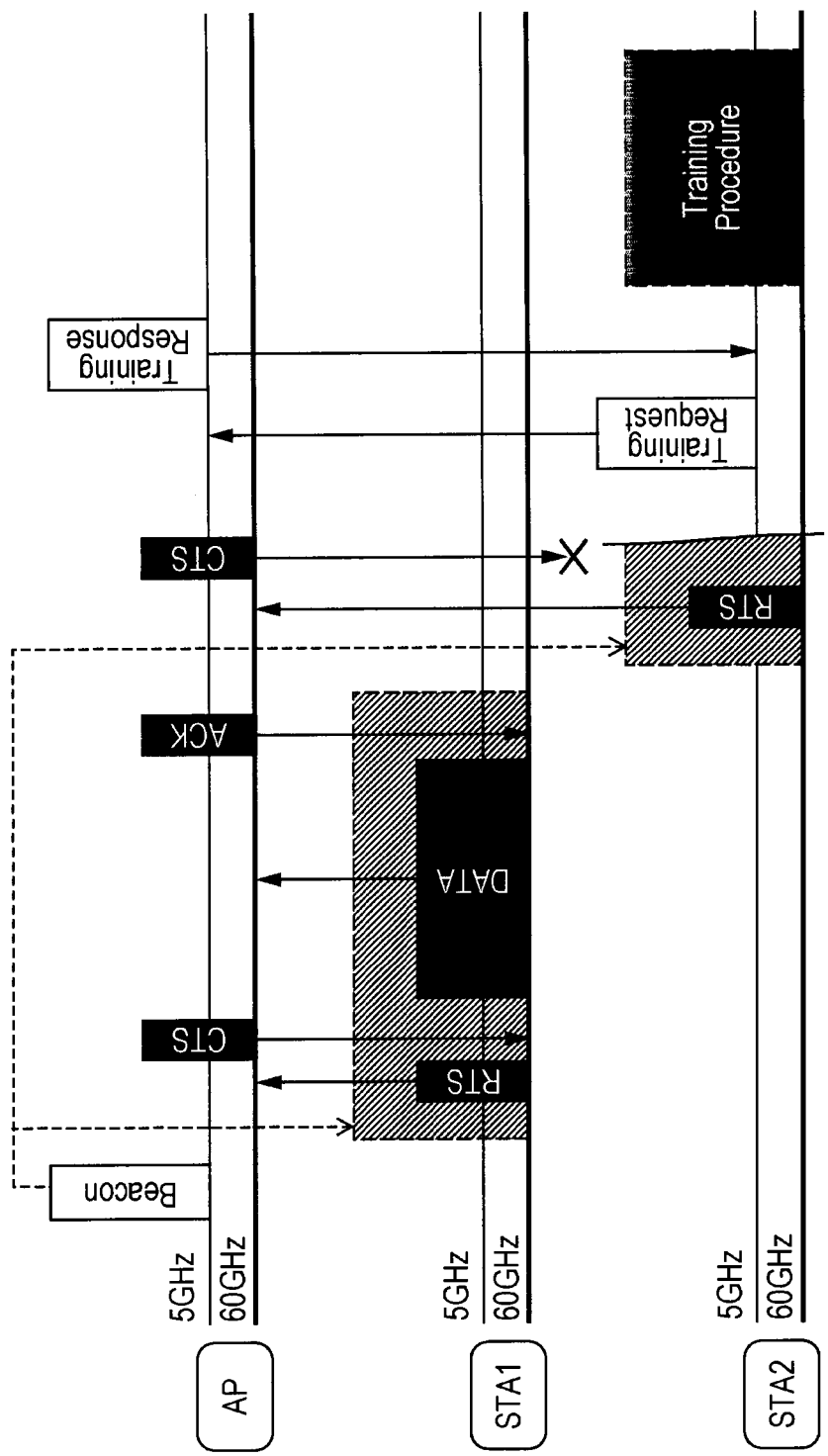
FIG. 13 illustrates another example of the signal transmission reception sequence where the link maintenance is carried out by utilizing the RTS/CTS hand shaking procedure.

FIG. 13 illustrates another example of the signal transmission reception sequence where the link maintenance is carried out by utilizing the RTS/CTS hand shaking procedure. In the signal transmission reception sequence illustrated in FIG. 13, it is assumed that the frame period of the beacon is already established between the access point (AP) and the respective terminal stations (STA1 and STA2). Also, when the directional communication link is invalidated, under an initiative of the terminal station (STA2), it is configured that a retraining on the directivity of the transmission and reception beams is carried out with respect to the access point (AP).

For every predetermined frame period, the access point (AP) reports the beacon in conformity with the first communication method of the 60 GHz band to effect the coordination with regard to the second communication method. Then, through the beacon, the transmission intervals in conformity with the second communication method are respectively allocated to the respective terminal stations (STA1 and STA2).

Toward the access point (AP) after the predetermined time period elapses from the leading of the transmission interval allocated to itself, the terminal station (STA1) transmits the RTS doubling as the link maintenance frame in conformity with the second communication method in which the directional communication link that was utilized in the previous time is utilized again.

On the other hand, through the reception of the RTS from the terminal station (STA1) in the transmission interval allocated to the terminal station (STA1) in conformity with the second communication method in which the directional communication link that was utilized in the previous time is utilized again, the access point (AP) can confirm that the directional communication link that was utilized in the previous time with the terminal station (STA1) is valid. Here, the access point (AP) may be adapted to update through the hand shake of the RTS, the state of the directional communication link (the optimal reception beam pattern). Then, after the predetermined frame interval SIFS elapses since the RTS is received, the access point (AP) transmits the CTS doubling as the link maintenance frame in conformity with the second communication method.

Through the reception of the CTS in conformity with the second communication method in which the directional communication link that was utilized in the previous time is utilized again, the terminal station (STA1) can confirm that the media is clear and also the directional communication link that was utilized in the previous time with the access point (AP) is valid. Here, through the hand shaking of the CTS, the terminal station (STA1) may be adapted to update the state of the directional communication link (the optimal reception beam pattern).

Then, after the SIFS elapses since the reception of the CTS, the terminal station (STA1) transmits the data frame in conformity with the second communication method in which the directional communication link that was utilized in the previous time is utilized again. When the reception of the data frame is ended without incident, the access point (AP) replies the ACK. Through the reception of the ACK, the terminal station (STA1) recognizes that the series of RTS/CTS hand shaking procedure is completed without incident.

Also, toward the access point (AP) after the predetermined time period elapses from the leading of the transmission interval allocated to itself, the terminal station (STA2) transmits the RTS doubling as the link maintenance frame in conformity with the second communication method in which the directional communication link that was utilized in the previous time is utilized again.

Through the reception of the RTS from the terminal station (STA2) at an expected time in conformity with the second communication method in which the directional communication link that was utilized in the previous time is utilized again, the access point (AP) can confirm that the directional communication link that was utilized in the previous time with the terminal station (STA2) is valid. Then, after the predetermined frame interval SIFS elapses since the RTS is received, the access point (AP) replies the CTS doubling as the link maintenance frame in conformity with the second communication method in which the directional communication link that was utilized in the previous time is utilized again.

However, as the CTS from the access point (AP) cannot be received in conformity with the second communication method in which the directional communication link that was utilized in the previous time is utilized again at an expected time after the RTS is transmitted by itself, the terminal station (STA2) can recognize that the directional communication link that was utilized in the previous time with the access point (AP) is invalidated.

In such a case, the terminal station (STA2) transmits a Training Request frame for requesting a conduction of a retraining on the directivity of the transmission and reception beams with the access point (AP). As the Training Request frame is transmitted in conformity with the first communication method that has no flying distance problems, the Training Request frame is expected to be delivered also to the communication party to which the link maintenance frame transmitted in conformity with the second communication method is not delivered.

Then, when the Training Request frame is received, the access point (AP) recognizes that the directional communication link that was utilized in the previous time is invalid and also replies a Training Response frame indicating that the retraining request on the directivity of the transmission and reception beams is accepted. As the directional communication link that was utilized in the previous time is invalid, the Training Response frame is also transmitted in conformity with the first communication method.

After that, a processing for performing the retraining on the directivity of the transmission and reception beams (Training Procedure) is executed between the terminal station (STA2) and the access point (AP). In the retraining, for example, the beam training signal BTF illustrated in FIG. 9 can be used, but the gist of the present invention is not limited to the particular retraining method.

In any of the signal transmission reception sequence examples illustrated in FIG. 10 and FIG. 13, the respective control frames of the RTS and the CTS are employed as the link maintenance frame, but it is set as the premise that the wireless communication in conformity with the second communication method is contention-free, that is, the infrastructure network between the terminal stations (STA1 and STA2).

In contrast to this, without being limited to the infrastructure network, even in the case of a contention type service, as the reply timing of the CTS is already known for the RTS transmission side, when only the CTS is employed as the link maintenance frame, it is possible to realize the link maintenance.

Figure 14:
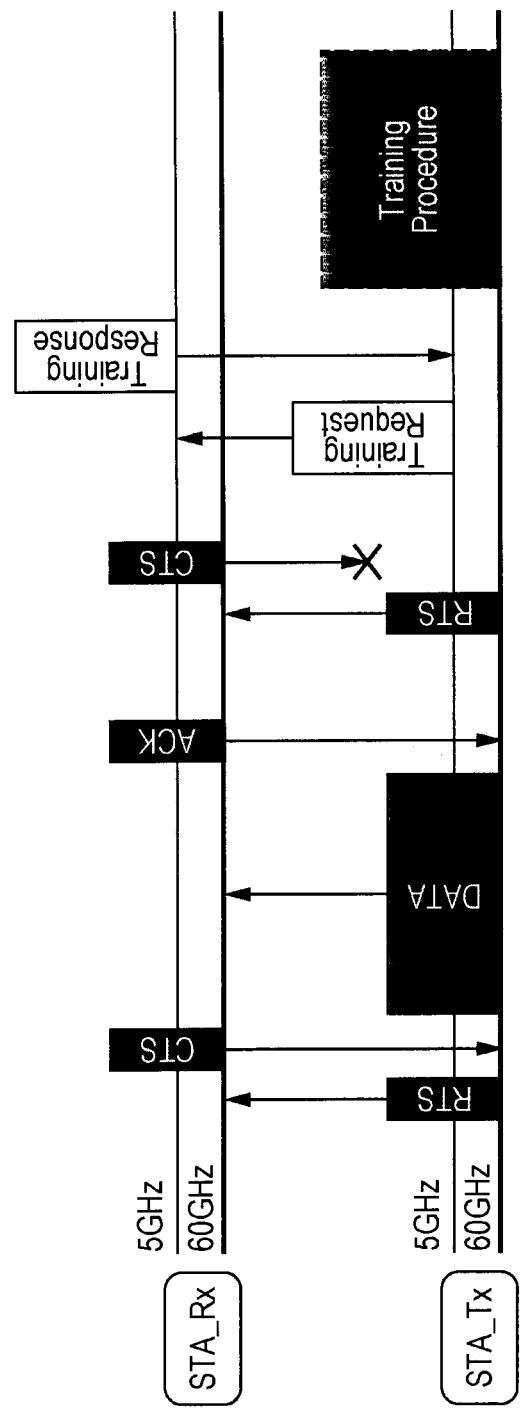
FIG. 14 illustrates still another example of the signal transmission reception sequence where the link maintenance is carried out by utilizing the RTS/CTS hand shaking procedure.

FIG. 14 illustrates a signal transmission reception sequence example where the link maintenance is carried out by utilizing the RTS/CTS hand shaking procedure in a case where only the CTS is employed as the link maintenance frame. In this case, when the directional communication link is invalidated, the retraining on the directivity of the transmission and reception beams is carried out under the initiative of the RTS transmission side.

The data transmission side (RTS transmission side: STA_Tx) first confirms that the media is clear only by a certain period of time through the CSMA procedure, and after that, transmits the RTS toward the data reception side (CTS transmission side: STA_Rx) in conformity with the second communication method.

In accordance with the reception of the RTS, after the predetermined frame interval SIFS elapses, the data reception side (STA_Rx) replies the CTS doubling as the link maintenance frame in conformity with the second communication method.

After the RTS is transmitted by itself, the data transmission side (STA_Tx) stands by the reception of the CTS replied from the data reception side (STA_Rx). Then, through the reception of the CTS in conformity with the second communication method in which the directional communication link that was utilized in the previous time is utilized again, the data transmission side (STA_Tx) can confirm that the media is clear and also the directional communication link that was utilized in the previous time with the data reception side (STA_Rx) is valid. Here, through the hand shaking of the CTS, the data transmission side (STA_Tx) may be adapted to update the state of the directional communication link (the optimal reception beam pattern).

Then, after the SIFS elapses since the reception of the CTS, the data transmission side (STA_Tx) transmits the data frame in conformity with the second communication method. Also, when the reception of the data frame is ended without incident, the data reception side (STA_Rx) replies the ACK. Through the reception of the ACK, the data transmission side (STA_Tx) recognizes that the series of RTS/CTS hand shaking procedure is completed without incident.

Subsequently, after it is confirmed that the media is clear for a certain time period through the CSMA procedure, the data transmission side (STA_Tx) transmits the RTS toward the data reception side (STA_Rx) in conformity with the second communication method. In contrast to this, in accordance with the reception of the RTS, after the predetermined frame interval SIFS elapses, the data reception side (STA_Rx) replies the CTS doubling as the link maintenance frame in conformity with the second communication method in which the directional communication link that was utilized in the previous time is utilized again.

However, while standing by for the reception of the CTS after the RTS is transmitted by itself, the CTS from the data reception side (STA_Rx) cannot be received at an expected time in conformity with the second communication method in which the directional communication link that was utilized in the previous time is utilized again, and thus the data transmission side (STA_Tx) can recognize the directional communication link that was utilized in the previous time with the data reception side (STA_Rx) is invalidated.

In such a case, the data transmission side (STA_Tx) transmits the Training Request frame for requesting the conduction of the retraining on the directivity of the transmission and reception beams with the data reception side (STA_Rx). As the Training Request frame is transmitted in conformity with the first communication method that has no flying distance problems, the Training Request frame is expected to be delivered also to the communication party to which the link maintenance frame transmitted in conformity with the second communication method is not delivered.

Then, when the Training Request frame is received, the data reception side (STA_Rx) recognizes that the directional communication link that was utilized in the previous time is invalid and also replies the Training Response frame indicating that the retraining request on the directivity of the transmission and reception beams is accepted. As the directional communication link that was utilized in the previous time is invalid, the Training Response frame is also transmitted in conformity with the first communication method instead of the second communication method.

After that, the processing (Training Procedure) for performing the retraining on the directivity of the transmission and reception beams is executed between the data transmission side (STA_Tx) and the data reception side (STA_Rx). For the retraining, for example, the beam training signal BTF illustrated in FIG. 9 can be used, but the gist of the present invention is not limited to the particular retraining method.

Figure 15:
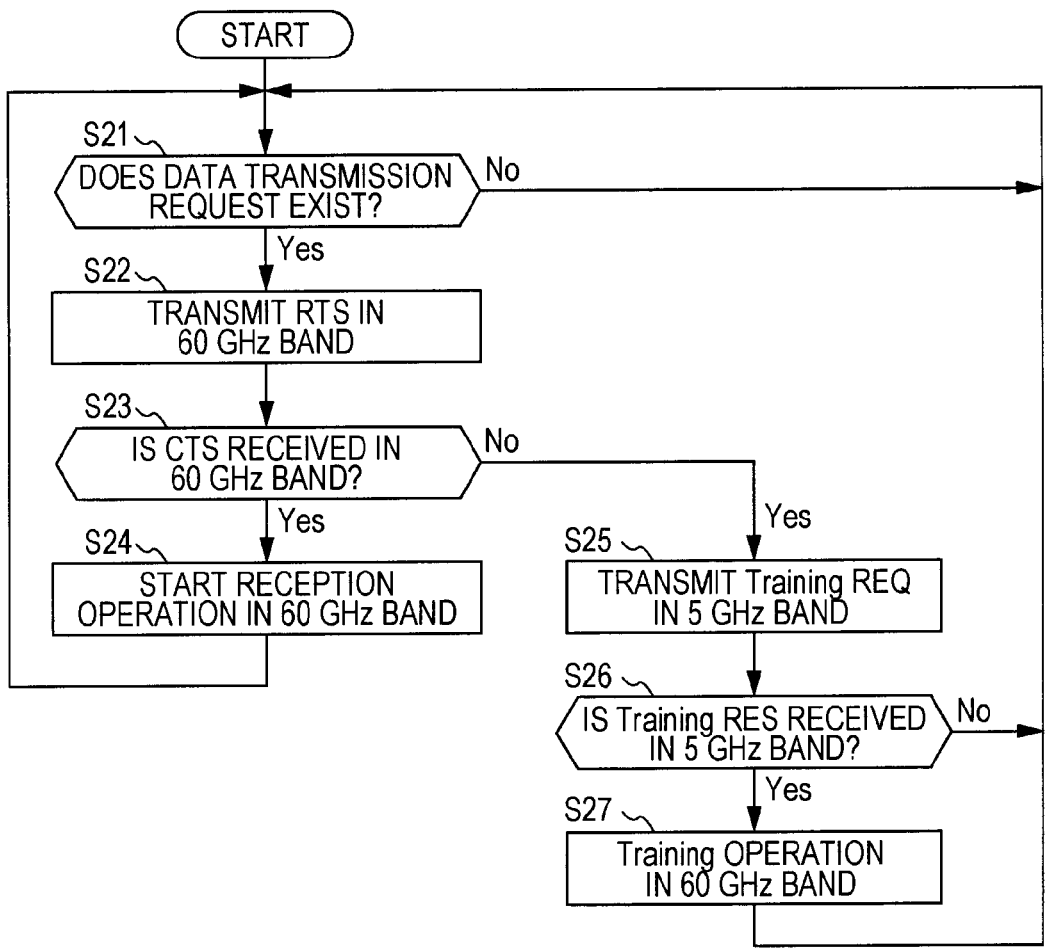
FIG. 15 is a flow chart illustrating a processing procedure for realizing the signal transmission reception sequence illustrated in FIG. 14 by the data transmission side (RTS transmission side: STA_Tx).

FIG. 15 illustrates a processing procedure for realizing the signal transmission reception sequence illustrated in FIG. 14 by the data transmission side (RTS transmission side: STA_Tx) in a flow chart format. It should be noted that the communication operation for each transmission interval of the respective terminal stations (STA1 and STA2) in the signal transmission reception sequence illustrated in FIG. 13 also becomes similar to the processing procedure illustrated in the same flow chart.

When the data transmission request is generated (Yes in step S21), after it is confirmed that the media is clear for a certain time period through the CSMA procedure, the data transmission side (STA_Tx) transmits the RTS toward the data reception side (STA_Rx) in conformity with the second communication method (step S22) and stands by for the reception of the CTS doubling as the link maintenance frame.

After the predetermined frame interval SIFS elapses since the RTS is transmitted, through the reception of the CTS from the data reception side (STA_Rx) in conformity with the second communication method in which the directional communication link that was utilized in the previous time is utilized again (Yes in step S23), the data transmission side (STA_Tx) can confirm that the media is clear and also the directional communication link that was utilized in the previous time with the data reception side (STA_Rx) is valid. Here, through the hand shaking of the CTS, the data transmission side (STA_Tx) may be adapted to update the state of the directional communication link (the optimal reception beam pattern).

Then after the SIFS elapses since the reception of the CTS, the data transmission side (STA_Tx) transmits the data frame in conformity with the second communication method in which the directional communication link that was utilized in the previous time is utilized again (step S24). Also, as the ACK is received from the data reception side (STA_Rx), the data transmission side (STA_Tx) recognizes that the series of RTS/CTS hand shaking procedure is completed without incident.

On the other hand, while standing by for the reception of the CTS after the RTS is transmitted by itself, in a case where the CTS from the data reception side (STA_Rx) cannot be received at an expected time in conformity with the second communication method in which the directional communication link that was utilized in the previous time is utilized again (No in step S23), the data transmission side (STA_Tx) can recognize that the directional communication link that was utilized in the previous time with the data reception side (STA_Rx) is invalidated.

In such a case, the data transmission side (STA_Tx) transmits the Training Request frame for requesting the conduction of the retraining on the directivity of the transmission and reception beams with the data reception side (STA_Rx) in conformity with the first communication method in which the Request frame has no flying distance problems (step S25).

Then, when the data transmission side (STA_Tx) receives the Training Response frame replied from the data reception side (STA_Rx) (Yes in step S26), the processing (Training Procedure) for performing the retraining on the directivity of the transmission and reception beams is executed between the data transmission side (STA_Tx) and the data reception side (STA_Rx) (step S27). For the retraining, for example, the beam training signal BTF illustrated in FIG. 9 can be used, but the gist of the present invention is not limited to the particular retraining method.

Figure 16:
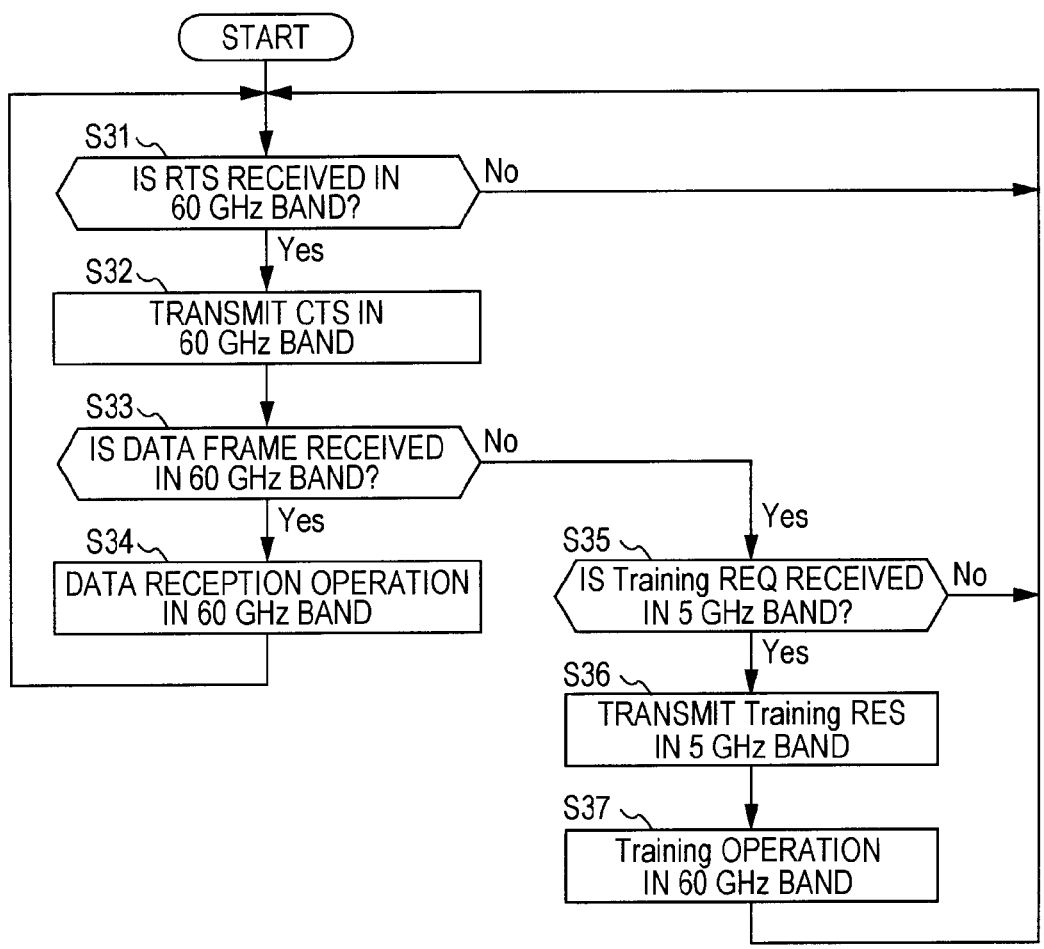
FIG. 16 is a flow chart illustrating a processing procedure for realizing the signal transmission reception sequence illustrated in FIG. 14 by the data reception side (CTS transmission side: STA_Rx).

FIG. 16 illustrates a processing procedure for realizing the signal transmission reception sequence illustrated in FIG. 14 by the data reception side (CTS transmission side: STA_Rx) in a flow chart format.

In accordance with the reception of the RTS from the data transmission side (STA_Tx) in conformity with the second communication method (Yes in step S31), after the predetermined frame interval SIFS elapses, the data reception side (STA_Rx) replies the CTS doubling as the link maintenance frame in conformity with the second communication method in which the directional communication link that was utilized in the previous time is utilized again (step S32).

After the CTS is replied, the reception standby is carried out in conformity with the second communication method, and when the data frame arrives from the data transmission side (STA_Tx) (Yes in step S33), in conformity with the second communication method in which the directional communication link that was utilized in the previous time is utilized again, the data reception side (STA_Rx) performs the reception operation of the data frame (step S34). Then, the data reception side (STA_Rx) replies the ACK when the reception of the data frame is ended without incident.

On the other hand, when the data frame cannot be received from the data transmission side (STA_Tx) in conformity with the second communication method (No in step S33) and instead of this, the Training Request frame is received in conformity with the first communication method (Yes in step S35), the data reception side (STA_Rx) recognizes that the directional communication link that was utilized in the previous time is invalid and also replies the Training Response frame indicating that the retraining request on the directivity of the transmission and reception beams is accepted in conformity with the first communication method (step S36).

After that, the processing (Training Procedure) for performing the retraining on the directivity of the transmission and reception beams is executed between the data transmission side (STA_Tx) and the data reception side (STA_Rx) (step S37). For the retraining, for example, the beam training signal BTF illustrated in FIG. 9 can be used, but the gist of the present invention is not limited to the particular retraining method.

In the signal transmission reception sequence illustrated in FIG. 10 and FIG. 13, the RTS and the CTS are adapted to double as the link maintenance frame, and also, in the signal transmission reception sequence illustrated in FIG. 14, the CTS is adapted to double as the link maintenance frame. In other words, it is supposed that any signal transmission reception sequence utilizes the RTS/CTS hand shaking procedure in the BSS in conformity with the second communication method. Furthermore, in the signal transmission reception sequence illustrated in the former FIG. 10 and FIG. 13, in the BSS in conformity with the second communication method, it is necessary to allocate the transmission interval to each terminal station and previously determine the RTS transmission timings of the respective terminal stations.

Figure 17:
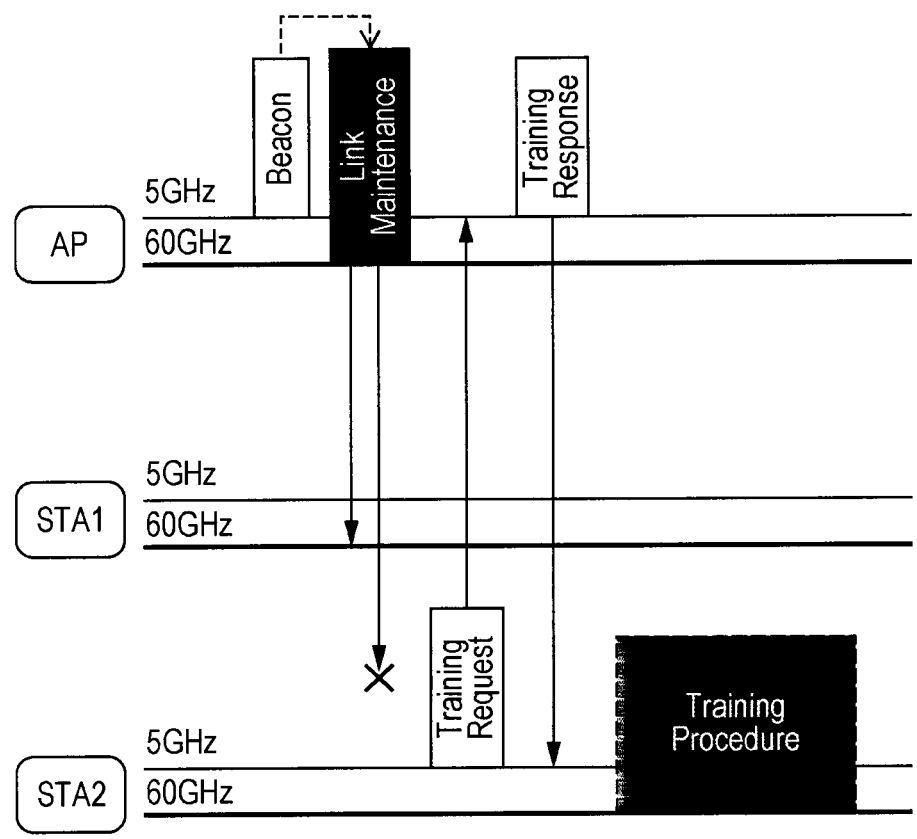
FIG. 17 illustrates a signal transmission reception sequence example where the link maintenance is carried out by using a dedicated-use link maintenance frame.

In contrast to this, a method of confirming the validity of the directional communication link that was utilized in the previous time by using a dedicated-use link maintenance frame without the dual use of the RTS and the CTS. FIG. 17 illustrates a signal transmission reception sequence example where the link maintenance is carried out by using the dedicated-use link maintenance frame without utilizing the RTS/CTS hand shaking procedure. It should be noted however that in the signal transmission reception sequence illustrated in the drawing, it is assumed that the frame period of the beacon is already established between the access point (AP) and the respective terminal stations (STA1 and STA2). Also, when the directional communication link is invalidated, the retraining on the directivity of the transmission and reception beams is carried out under the initiative of the RTS transmission side.

For every predetermined frame period, the access point (AP) reports the beacon in conformity with the first communication method of the 60 GHz band to effect the coordination with regard to the second communication method. Here, through the beacon, a timing is notified at which the access point (AP) reports the link maintenance frame in conformity with the second communication method in the 60 GHz band.

When the reporting timing of the link maintenance frame notified through the beacon comes, the respective terminal stations (STA1 and STA2) stands by for the reception of the link maintenance frame in conformity with the second communication method in which the directional communication link that was utilized in the previous time is utilized again. Also, when the reporting timing of the link maintenance frame comes, the access point (AP) notifies the link maintenance frame with non-directivity in conformity with the second communication method.

Through the successful reception of the link maintenance frame from the access point (AP) in conformity with the second communication method in which the directional communication link that was utilized in the previous time is utilized again, one terminal station (STA1) can confirm that the directional communication link that was utilized in the previous time with the access point (AP) is valid. Here, the terminal station (STA1) may be adapted to update the state of the directional communication link (the optimal reception beam pattern) through the hand shaking of the CTS.

As the link maintenance frame from the access point (AP) cannot be received at an expected time in conformity with the second communication method in which the directional communication link that was utilized in the previous time is utilized again, the other terminal station (STA2) can recognize that the directional communication link that was utilized in the previous time with the access point (AP) is invalidated.

In such a case, the terminal station (STA2) transmits the Training Request frame for requesting the conduction of the retraining on the directivity of the transmission and reception beams with the access point (AP). As the Training Request frame is transmitted in conformity with the first communication method that has no flying distance problems, the Training Request frame is expected to be delivered also to the communication party to which the link maintenance frame transmitted in conformity with the second communication method is not delivered.

Then, when the Training Request frame is received, the access point (AP) recognizes that the directional communication link that was utilized in the previous time is invalid and also replies the Training Response frame indicating that the retraining request on the directivity of the transmission and reception beams is accepted. As the directional communication link that was utilized in the previous time is invalid, the Training Response frame is also transmitted in conformity with the first communication method.

After that, the processing (Training Procedure) for performing the retraining on the directivity of the transmission and reception beams is executed between the terminal station (STA2) and the access point (AP). For the retraining, for example, the beam training signal BTF illustrated in FIG. 9 can be used, but the gist of the present invention is not limited to the particular retraining method.

Figure 18:
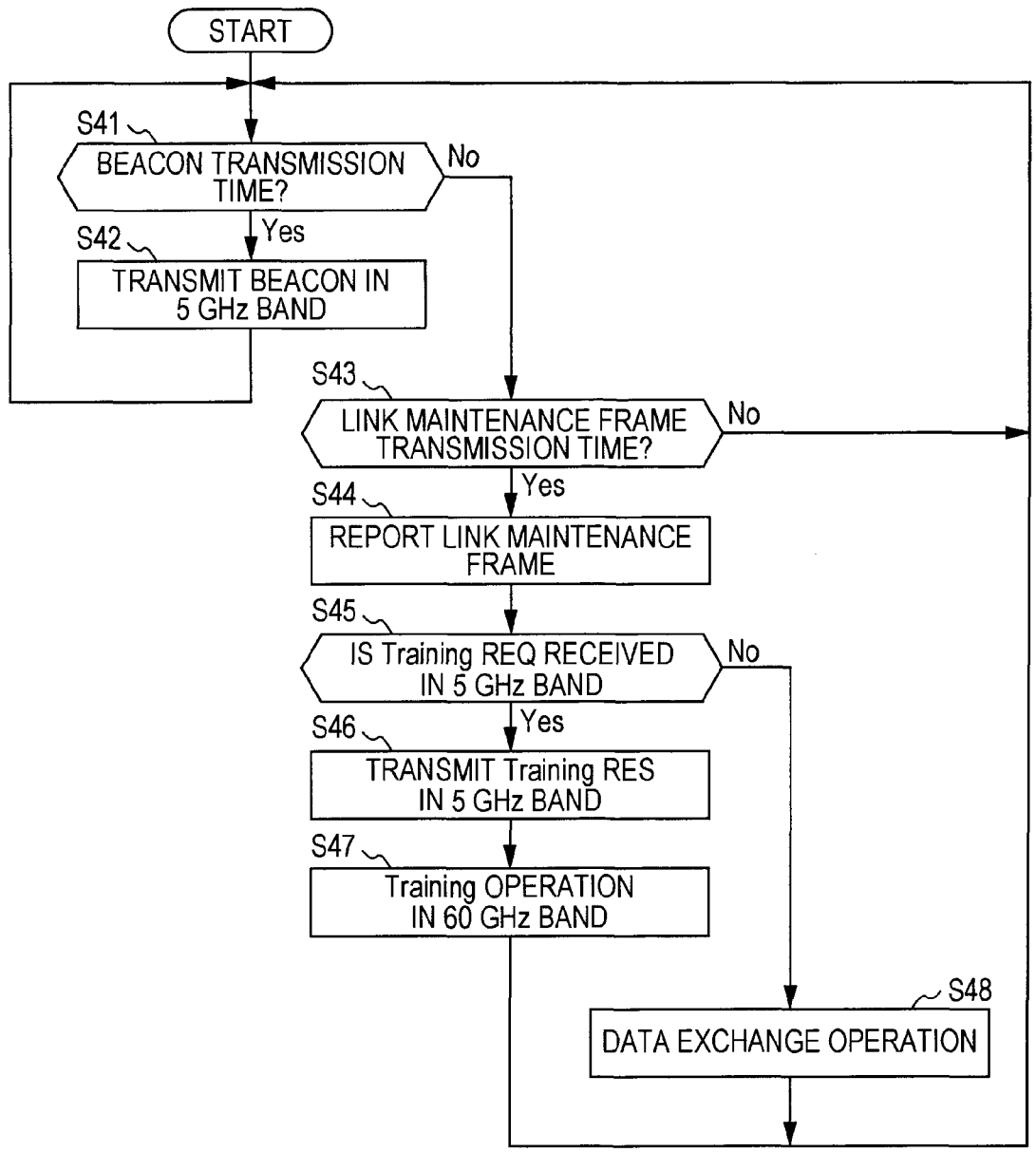
FIG. 18 is a flow chart illustrating a processing procedure for realizing the signal transmission reception sequence illustrated in FIG. 17 by a transmission side of the link maintenance frame.

FIG. 18 illustrates a processing procedure for realizing the signal transmission reception sequence illustrated in FIG. 17 by the access point (AP) that becomes a transmission side of the link maintenance frame in a flow chart format.

When the beacon transmission time for every frame period comes (Yes in step S41), the access point (AP) transmits the beacon in conformity with the 5 GHz, that is, the first communication method (step S42). In the beacon, the BSS operational information at the time of the communication in conformity with the first communication method and the BSS operational information at the time of the communication in conformity with the second communication method are described, and as the peripheral respective terminal stations receive the beacon, the coordination in the BSS is effected. Also, the information related to the timing for the access point (AP) to transmit the link maintenance within the frame period is also described as the BSS operational information at the time of the communication in conformity with the second communication method.

Then, when the reporting timing of the link maintenance frame comes (Yes in step S43), the access point (AP) notifies the link maintenance frame with non-directivity in conformity with the second communication method (step S44).

Here, when the Training Request frame for requesting the conduction of the retraining on the directivity of the transmission and reception beams is not received from any of the terminal stations (STA1 and STA2) (No in step S45), the access point (AP) can confirm that the directional communication link that was utilized in the previous time with the respective terminal stations (STA1 and STA2) is valid. In this case, the access point (AP) performs the data exchange operation in conformity with the second communication method between the respective terminal stations (STA1 and STA2) by respectively utilizing the directional communication link that was utilized in the previous time (step S48).

On the other hand, when the Training Request frame is received from any one of the terminal stations (STA1 and STA2) (Yes in step S45), the access point (AP) can recognize that the directional communication link with the transmission source of the Training Request frame that was utilized in the previous time is invalidated.

In this case, the access point (AP) replies the Training Response frame indicating that the retraining request on the directivity of the transmission and reception beams is accepted in conformity with the first communication method (step S46). Then, the processing (Training Procedure) for performing the retraining on the directivity of the transmission and reception beams is executed with the terminal station at the request source (step S47). For the retraining, for example, the beam training signal BTF illustrated in FIG. 9 can be used, but the gist of the present invention is not limited to the particular retraining method.

After that, the directional communication link is formed by using the transmission and reception beams obtained through the retraining, and the data exchange operation with the terminal station is carried out in conformity with the second communication method (step S48).

Figure 19:
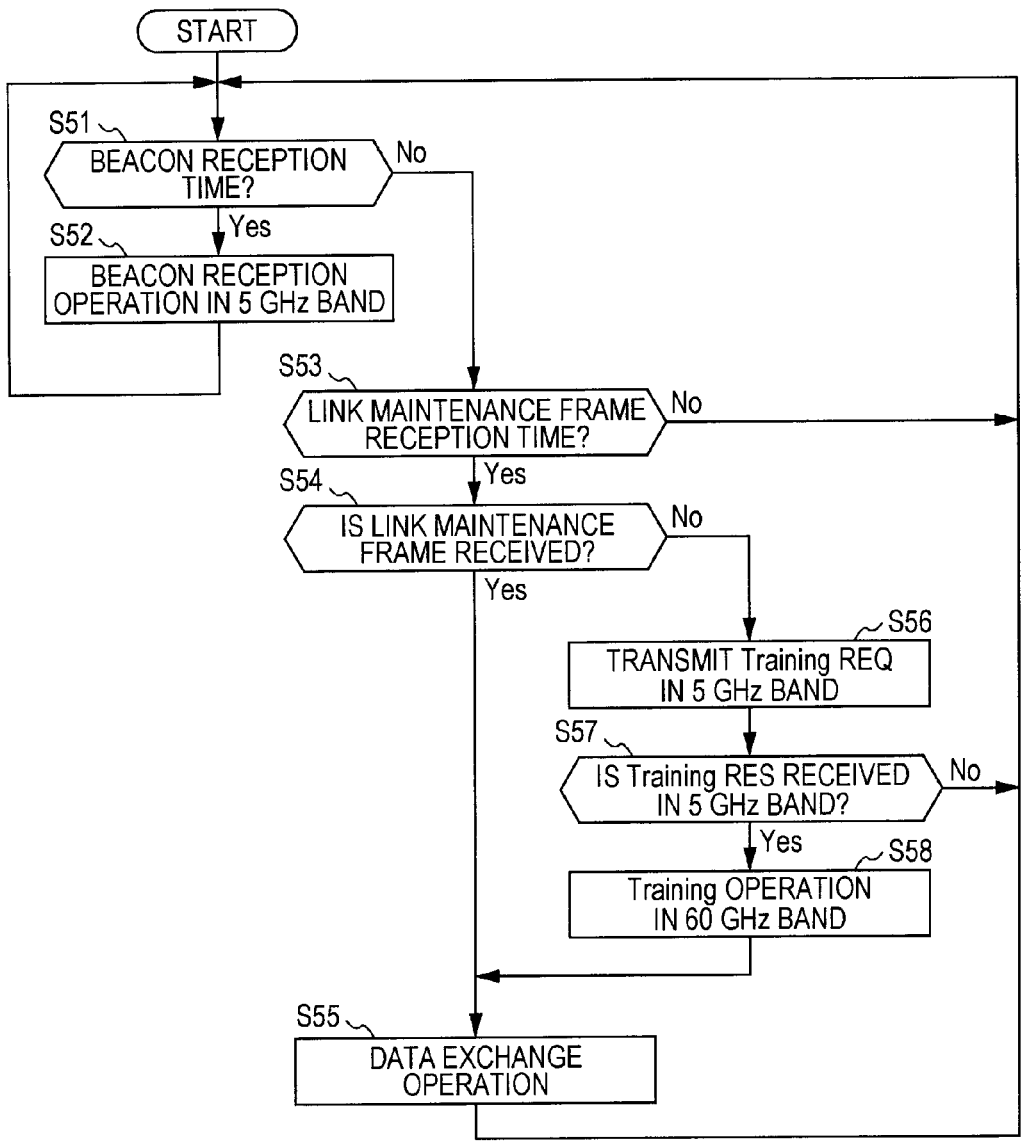
FIG. 19 is a flow chart illustrating a processing procedure for realizing the signal transmission reception sequence illustrated in FIG. 17 by a receiving side of the link maintenance frame.

FIG. 19 illustrates a processing procedure for realizing the signal transmission reception sequence illustrated in FIG. 17 by the terminal stations (STAT and STA2) that becomes a reception side of the link maintenance frame in a flow chart format.

When the beacon reception time for every frame period comes (Yes in step S51), the terminal station (STA) starts the reception operation in conformity with the 5 GHz, that is, the first communication method and receives the beacon from the access point (AP) (step S52). In the beacon, the BSS operational information at the time of the communication in conformity with the first communication method and also the BSS operational information at the time of the communication in conformity with the second communication method are described. Also, the information related to the timing for the access point (AP) to transmit the link maintenance within the frame period is also described as the BSS operational information at the time of the communication in conformity with the second communication method.

Then, when the reporting timing of the link maintenance frame comes (Yes in step S53), in conformity with the second communication method in which the directional communication link that was utilized in the previous time is utilized again, the terminal station (STA) stands by for the reception of the link maintenance frame (step S54).

Here, when the link maintenance frame from the access point (AP) can be successfully received in conformity with the second communication method in which the directional communication link that was utilized in the previous time is utilized again (Yes in step S54), in conformity with the second communication method in which the directional communication link that was utilized in the previous time is utilized again, the terminal station (STA) performs the data exchange operation with the access point (AP) (step S55).

On the other hand, when the link maintenance frame from the access point (AP) at an expected time cannot be received in conformity with the second communication method in which the directional communication link that was utilized in the previous time is utilized again (No in step S54), the terminal station (STA) recognizes that the directional communication link that was utilized in the previous time with the access point (AP) is invalidated.

In this case, the terminal station (STA) transmits the Training Request frame for requesting the conduction of the retraining on the directivity of the transmission and reception beams with the access point (AP) in conformity with the first communication method in which the Request frame has no flying distance problems (step S56).

Then, when the Training Response frame replied from the access point (AP) is received (Yes in step S57), the terminal station (STA) executes the processing (Training Procedure) for performing the retraining on the directivity of the transmission and reception beams between the data transmission side (STA_Tx) and the data reception side (STA_Rx) (step S58). For the retraining, for example, the beam training signal BTF illustrated in FIG. 9 can be used, but the gist of the present invention is not limited to the particular retraining method.

After that, the directional communication link is formed by using the transmission and reception beams obtained through the retraining, and in conformity with the second communication method, the data exchange operation with the access point (AP) is carried out (step S55).

According to the embodiment described so far, the coordination in the communication in conformity with the second communication method is effected through the communication in conformity with the first communication method, and on the other hand, the data transmission after the coordination is effected is carried out exclusively through the second communication method, that is, an operational mode of the BSS utilizing the first communication method in an auxiliary manner. In contrast to this, in parallel with the data transmission in conformity with the second communication method, an operational mode of the BSS is also conceivable in which the data transmission in conformity with the first communication method is also carried out.

For example, it is possible to realize the improvement in the throughput by sorting the transmission data in the respective communication methods in such a manner that data requiring stability is transmitted in conformity with the first communication method, and on the other hand, data requiring a communication rate (for example, large capacity contents) is transmitted in conformity with the second communication method.

The operational mode of utilizing both the first communication method and the second communication method for the data transmission can further be roughly divided into an operational mode in which the scheduling is performed by both the communication methods in synchronization with each other and the data transmission is performed completely simultaneously and an operational mode in which the scheduling is performed independently in the respective communication methods.

Figure 20:
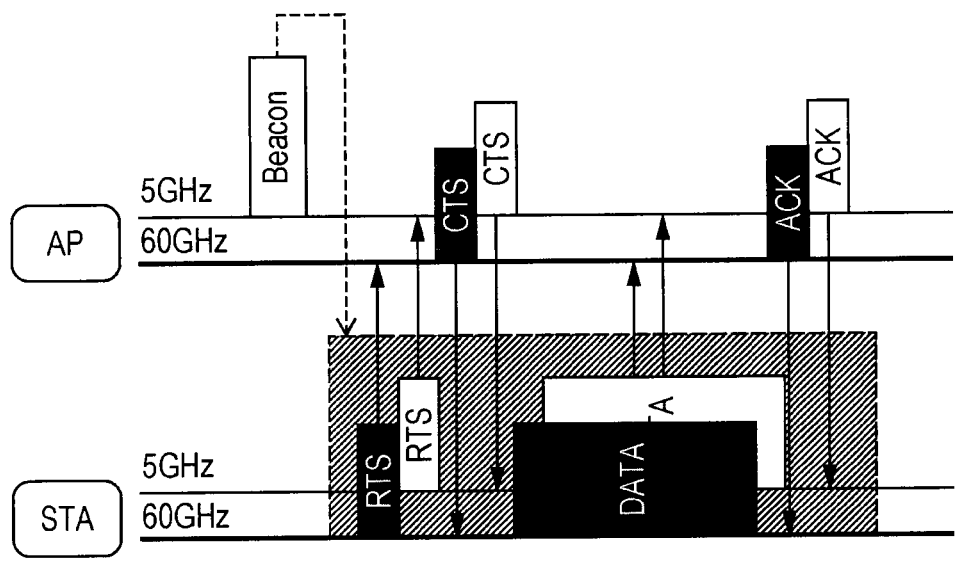
FIG. 20 illustrates an example of a signal transmission reception sequence between the access point (AP) and the terminal station (STA) in a case where scheduling is synchronously carried out in first and second communication methods and a data transmission is carried out completely at the same time.

FIG. 20 illustrates an example of a signal transmission reception sequence between the access point (AP) and the terminal station (STA) in a case where scheduling is synchronously carried out in the first and second communication methods and a data transmission is carried out completely at the time. In the example illustrated in the drawing, according to the first and second communication methods, the access point (AP) provides the contention-free service to the terminal station (STA).

For every predetermined frame period, the access point (AP) reports the beacon in conformity with the first communication method of the 60 GHz band, and the surrounding the terminal stations (STA) receive this to be put under the control of the access point (AP) to effect the coordination with regard to the first communication method in the BSS and also the coordination with regard to the second communication method in the 60 GHz band.

In the beacon, as the BSS operational information at the time of the communication in conformity with the second communication method, the schedule information such as the transmission timing in the second communication method allocated to the terminal station (STA) is described (as described above and see FIG. 7). In the example illustrated in FIG. 20, in conformity with the schedule information described in the beacon, within the frame period, the interval represented by the left diagonal lines is allocated to the transmission interval in conformity with the second communication method of the terminal station (STA), and the terminal station (STA) can perform the wireless communication in conformity with the second communication method on contention-free.

In the transmission interval allocated to itself (left diagonal line section), the terminal station (STA) executes the RTS/CTS hand shaking procedure with the access point (AP). That is, when the transmission interval allocated to itself enters, the terminal station (STA) transmits the RTS toward the access point (AP) in conformity with the second communication method. Also, the terminal station (STA) simultaneously transmits the RTS in conformity with the first communication method.

On the other hand, when the starting time of the transmission interval allocated to the terminal station (STA) arrives, in preparation to the wireless communication in conformity with the second communication method with the terminal station (STA), the access point (AP) controls the directivity of the second wireless communication unit 170 so that the transmission and reception beam patterns become optimal to the terminal station (STA) and starts the reception operation. Then, in response to the reception of the RTS, after the predetermined frame interval SIFS elapses, the access point (AP) replies the CTS for feeding back the status that the RTS has been successfully received respectively in conformity with the first and second communication methods.

Then, when it is confirmed that the media is clear through the reception of the CTS without incident, after the SIFS elapses, the terminal station (STA) sorts the transmission data in the first and second communication methods, and in synchronization with the data frame transmission through the second communication method, the transmission of the data frame through the first communication method is carried out in parallel.

After the CTS is transmitted, the access point (AP) stands by for the data frame. Then, when the reception of the data frame is ended without incident respectively in conformity with the first and second communication methods, after the SIFS elapses, the ACK is replied respectively in conformity with the first and second communication methods. Through the reception of the ACK, the terminal station (STAT) recognizes that the series of RTS/CTS hand shaking procedure is completed without incident.

Figure 21:
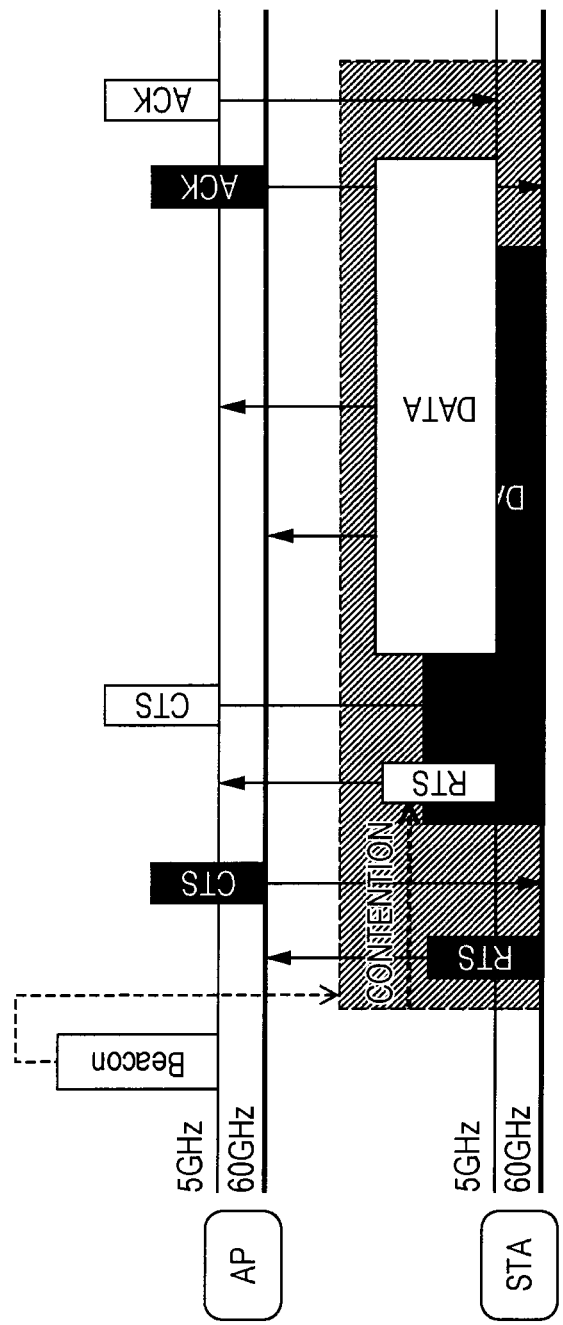
FIG. 21 illustrates an example of a signal transmission reception sequence between the access point (AP) and the terminal station (STA) in a case where the scheduling is independently carried in the first and second communication methods.

FIG. 21 illustrates an example of a signal transmission reception sequence between the access point (AP) and the terminal station (STA) in a case where the scheduling is independently carried in the first and second communication methods. In the example illustrated in the drawing, the contention-free service is provided in the second communication method, and on the other hand the contention-type service is provided in the first communication method.

For every predetermined frame period, the access point (AP) reports the beacon in conformity with the first communication method of the 60 GHz band, and the surrounding the terminal stations (STA) receive this to be put under the control of the access point (AP) to effect the coordination regard to the first communication method in the BSS and also the coordination with regard to the second communication method in the 60 GHz band.

In the beacon, as the BSS operational information at the time of the communication in conformity with the second communication method, the schedule information such as the transmission timing in the second communication method allocated to the terminal station (STA1) is described (as described above and see FIG. 7). In the example illustrated in FIG. 21, in conformity with the schedule information described in the beacon, within the frame period, the interval represented by the left diagonal lines is allocated to the transmission interval in conformity with the second communication method of the terminal station (STA), and the terminal station (STA) can perform the wireless communication in conformity with the second communication method on contention-free.

The terminal station (STA) executes the RTS/CTS hand shaking procedure in the transmission interval allocated to itself (left diagonal line section) with the access point (AP). That is, when the transmission interval allocated to itself enters, the terminal station (STA) transmits the RTS toward the access point (AP) in conformity with the second communication method.

On the other hand, when the starting time of the transmission interval allocated to the terminal station (STA) arrives, in preparation to the wireless communication in conformity with the second communication method with the terminal station (STA), the access point (AP) controls the directivity of the second wireless communication unit 170 so that the transmission and reception beam patterns become to the terminal station (STA) and starts the reception operation. Then, in response to the reception of the RTS in conformity with the second communication method, after the predetermined frame interval SIFS elapses, the access point (AP) replies the CTS for feeding back the status that the RTS has been successfully received in conformity with the second communication method respectively.

Then, when it is confirmed that the media is clear through the reception of the CTS without incident, after the SIFS elapses, the terminal station (STA) transmits the transmission data sorted in the second communication method in conformity with the second communication method.

After the CTS is transmitted, the access point (AP) stands by for the data frame. Then, in conformity with the second communication method when the reception of the data frame is ended without incident, after the SIFS elapses, the ACK is replied respectively in conformity with the second communication method. Through the reception of the ACK, the terminal station (STA1) recognizes that the series of RTS/CTS hand shaking procedure in conformity with the second communication method is completed without incident.

Also, according to the first communication method, a communication procedure based on an access right regulation which is different from the second communication method is executed. In the example illustrated in the drawing, while being independent from the transmission interval set in the second communication method, the contention-type service is provided with regard to the first communication method, and the terminal station (STA) can perform the data transmission in accordance with a channel availability situation.

When the transmission interval allocated to itself enters, first, confirms that the media is clear only by a certain period of time through the CSMA procedure, and after that, the terminal station (STA) transmits the RTS toward the access point (AP) in conformity with the first communication method.

On the other hand, the access point (AP) starts the reception operation in conformity with the first communication method when the starting time of the transmission interval allocated to the terminal station (STA) arrives. Then, in response to the reception of the RTS, after the predetermined frame interval SIFS elapses, the CTS for feeding back the status that the RTS has been successfully received is replied respectively in conformity with the first communication method.

Then, when it is confirmed that the media is clear through the reception of the CTS without incident, after the SIFS elapses, the terminal station (STA) transmits the transmission data allocated to the first communication method in conformity with the first communication method.

After the CTS is transmitted, the access point (AP) stands by for the data frame. Then, in conformity with the first communication method when the reception of the data frame is ended without incident, after the SIFS elapses, the ACK is replied respectively in conformity with the second communication method. Through the reception of the ACK, the terminal station (STA1) recognizes that the series of RTS/CTS hand shaking procedure in conformity with the first communication method is completed without incident.

It should be noted that the wireless communication apparatus 100 operating as the access point (AP) or the terminal station (STA) may be, for example, a portable information terminal such as a personal computer (PC), a mobile phone device, or a PDA (Personal Digital Assistant), an information device such as a portable music player or a game machine, or a wireless communication module mounted to a television receiver or other home information appliances.

Figure 22:
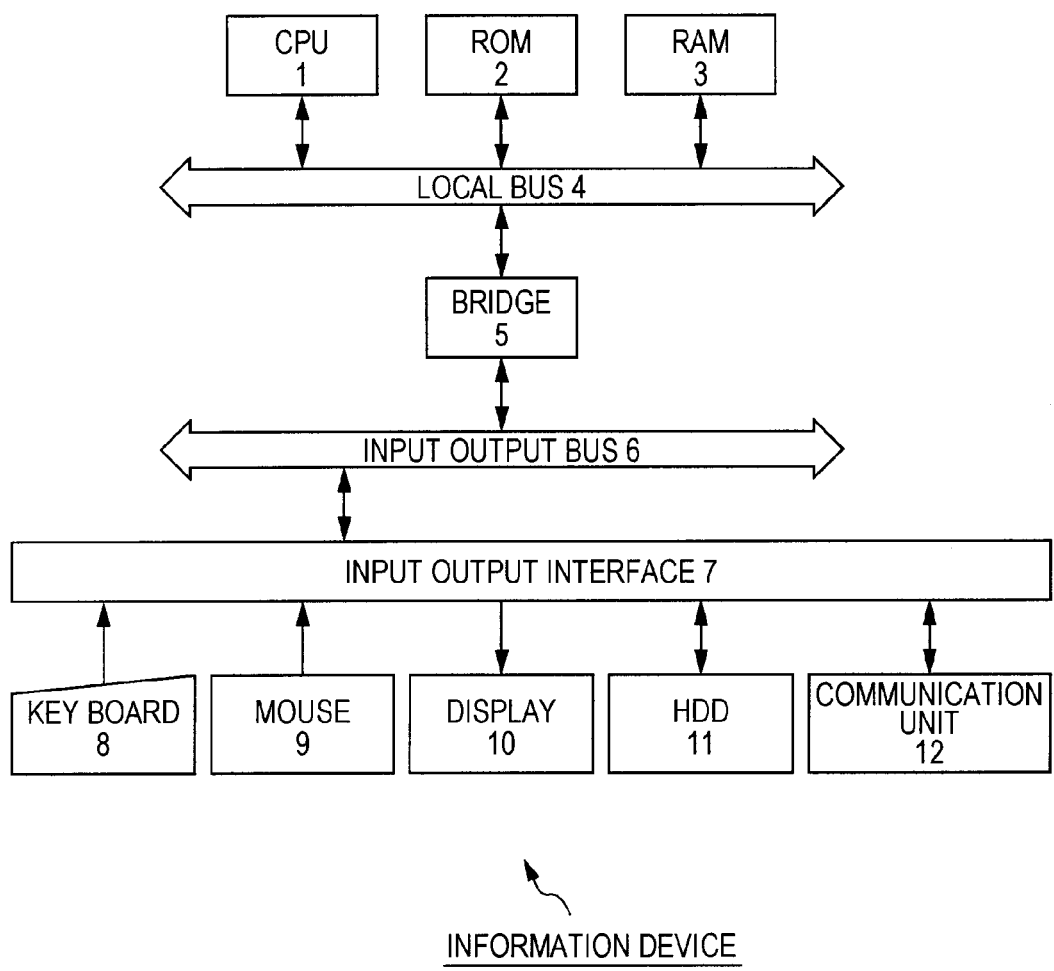
FIG. 22 illustrates a configuration example of an information device to which the modular wireless communication apparatus 100 is mounted.

FIG. 22 illustrates a configuration example of an information device to which the modular wireless communication apparatus 100 is mounted.

A CPU (Central Processing Unit) 1 executes a program stored in a ROM (Read Only Memory) 2 or a hard disc drive (HDD) 11 under a program execution environment provided by an operating system (OS). For example, a synchronization processing for the reception frames which will be described below or a part of the processing can also be realized in a mode in which the CPU 1 executes a predetermined program.

The ROM 2 stores a program code such as POST (Power On Self Test) or BIOS (Basic Input Output System) on a permanent basis. A RAM (Random Access Memory) 3 is used for loading the program stored in the ROM 2 or the HDD (Hard Disk Drive) 11 when the CPU 1 executes or temporarily holding operational data of the program in execution. These are mutually connected by a local bus 4 that is directly connected to a local pin of the CPU 1.

The local bus 4 is connected to an input output bus 6 such as a PCI (Peripheral Component Interconnect) bus via a bridge 5.

A key board 8 and a pointing device 9 such as a mouse are input devices operated by the user. A display 10 is composed of an LCD (Liquid Crystal Display), a CRT (Cathode Ray Tube), or the like and displays various pieces of information by way of a text and an image.

The HDD 11 is a drive unit having a built-in hard disc as a recording media and drives the hard disc. The hard disc is used for installing programs such as the operating system or various applications executed by the CPU 1 or saving data files or the like.

A communication unit 12 is a wireless communication interface structured by putting the wireless communication apparatus 100 into a module, operates as an access point or a terminal station under an infrastructure mode or operates under an adhoc mode, and executes communications with other communication terminals existing within a communication range. The operation by the wireless communication apparatus 100 is the same as already described.

INDUSTRIAL APPLICABILITY

In the above, the present invention has been described in detail with reference to the particular embodiments. However, it is obvious that those skilled in the art may achieve modifications and substitutions of the relevant embodiments within a range without departing from the gist of the present invention.

In the present specification, the embodiment in which the first communication method is set as the 5 GHz band used in IEEE802.11a that is widely spread as the wireless LAN standard and the second communication method is set as the 60 GHz band used in IEEE802.15.3c has been mainly described, but the gist of the present invention is not necessarily limited to a particular frequency band. Also, the second communication method may be not only the millimeter wave communication but also the other directional communications.

To elaborate, the present invention has been disclosed by way of exemplifications, and the description content of the present specification should not be construed in a limited manner. To determine the gist of the present invention, the scope of the claims should be referred to.

REFERENCE SIGNS LIST

1 CPU, 2 ROM, 3 RAM, 4 local bus, 5 bridge, 6 input output bus, 7 input output interface, 8 key board, 9 pointing device (mouse), 10 display, 11 HDD, 12 communication unit, 100 wireless communication apparatus, 110 antenna (first communication method), 120 first wireless communication unit, 122 first analog unit, 124 AD conversion unit, 126 DA conversion unit, 130 first digital unit, 131 synchronization unit, 132 demodulation decoding unit, 133 encoding modulation unit, 140 control unit, 150 storage unit, 160a to 160n plural antennas (second communication method), 170 second wireless communication unit, 172 second analog unit, 174 AD conversion unit, 176 DA conversion unit, 180 second digital unit, 181 synchronization unit, 182 reception beam processing unit, 183 power calculation unit, 184 decision unit, 185 demodulation decoding unit, 186 encoding modulation unit, 187 transmission beam processing unit, 190 control unit

The invention claimed is:

1. A communication apparatus comprising:
a first wireless communication unit that performs a wireless communication in conformity with a first communication method; and
a second wireless communication unit that can perform a directional wireless communication in conformity with a second communication method using a frequency band higher than the first communication method, wherein a control frame including control information for effecting a coordination with one or more communication parties that perform a wireless communication in conformity with the second communication method is transmitted from the first wireless communication, wherein with respect to the one or more communication parties, a frame including information for specifying a timing when the one or more communication parties should transmit a link maintenance frame for checking a validity of a communication link in conformity with the second communication method is transmitted from the first wireless communication unit in conformity with the first communication method, and wherein at the transmission timing, the second wireless communication unit transmits the link maintenance frame in conformity with the second communication method.

2. The communication apparatus according to claim 1, wherein the control information includes information related to a capability of the wireless communication in conformity with the second communication method by the second communication unit.

3. The communication apparatus according to claim 1, wherein the control information includes information related to a channel used in the wireless communication in conformity with the second communication method by the second communication unit.

4. The communication apparatus according to claim 1, wherein the control information includes information related to a transmission beam or a reception beam formed when the wireless communication in conformity with the second communication method is performed by the second communication unit.

5. The communication apparatus according to claim 1, wherein the control information includes information related to a timing when the one or more communication parties starts a transmission operation in conformity with the second communication method which is allocated to the communication party, and wherein a reception operation in conformity with the second communication method by the second wireless communication unit in conformity with the transmission starting timing is started.

6. The communication apparatus according to claim 1, wherein the control information includes information related to a timing when the one or more communication parties starts a transmission operation in conformity with the second communication method which is allocated to the one or more communication parties, and wherein an RTS (Request To Send) transmitted by the one or more communication parties in accordance with the transmission starting timing in conformity with the second communication method is subjected to a reception processing as the link maintenance frame.

7. The communication apparatus according to claim 1, wherein in a case where the link maintenance frame cannot be received at the transmission timing, the timing when the link maintenance frame should be transmitted by the one or more communication parties and the reschedule frame including the information related to the rescheduled transmission timing is transmitted from the first wireless communication unit in conformity with the first communication method.

8. The communication apparatus according to claim 1, wherein when a training request frame for requesting a retraining on the directivity of the transmission and reception beams is received from the one or more communication parties in conformity with the first communication method, a training request response frame is replied in conformity with the first communication method, and also a retraining processing on the directivity of the transmission and reception beams is executed with the one or more communication parties.

9. A communication method in a communication apparatus provided with a first wireless communication unit that performs a wireless communication in conformity with a first communication method and a second wireless communication unit that can perform a directional wireless communication in conformity with a second communication method using a frequency band higher than the first communication method, the communication method comprising:

a step of transmitting a control frame including control information for effecting a coordination with one or more communication parties that perform a wireless communication in conformity with the second communication method from the first wireless communication unit, wherein with respect to the one or more communication parties, a frame including information for specifying a timing when the one or more communication parties should transmit a link maintenance frame for checking a validity of a communication link in conformity with the second communication method is transmitted from the first wireless communication unit in conformity with the first communication method, and wherein at the transmission timing, the second wireless communication unit transmits the link maintenance frame in conformity with the second communication method.

10. A communication apparatus comprising:

a first wireless communication unit that performs a wireless communication in conformity with a first communication method; and a second wireless communication unit that can perform a directional wireless communication in conformity with a second communication method using a frequency band higher than the first communication method, wherein a control frame including control information for effecting a coordination with one or more communication parties that perform a wireless communication in conformity with the second communication method is received by the first wireless communication unit, wherein with respect to the one or more communication parties, a frame including information for specifying a timing when the one or more communication parties should transmit a link maintenance frame for checking a validity of a communication link in conformity with the second communication method is transmitted from the first wireless communication unit in conformity with the first communication method, and wherein at the transmission timing, the second wireless communication unit transmits the link maintenance frame in conformity with the second communication method.

11. The communication apparatus according to claim 10, wherein the control information includes information related to a timing when a transmission operation in conformity with the second communication method is started by itself which is allocated from the one or more communication parties, and wherein a transmission operation in conformity with the second communication method by the second wireless communication unit is started in conformity with the transmission starting timing.

12. The communication apparatus according to claim 10, wherein the control information includes information related to a timing when a transmission operation in conformity with the second communication method is started by itself which is allocated from the one or more communication parties, and wherein in accordance with the transmission starting timing, an RTS (Request To Send) doubling as the link maintenance frame is transmitted in conformity with the second communication method.

13. The communication apparatus according to claim 10, wherein an RTS (Request To Send) is transmitted in conformity with the second communication method in accordance with a predetermined transmission start timing, and also a CTS (Clear To Send) doubling as the link maintenance frame is subjected to a reception processing.

14. The communication apparatus according to claim 13, wherein in a case where the link maintenance frame cannot be received, a training request frame is transmitted from the first wireless communication unit in conformity with the first communication method, and also in response to a reception of a training request response frame from the one or more communication parties in conformity with the first communication method, a retraining processing on a directivity of transmission and reception beams is executed with the one or more communication parties.

15. The communication apparatus according to claim 10, wherein in synchronization with an interval during which a transmission of a data frame is performed from the second wireless communication unit to the one or more communication parties in conformity with the second communication method, a transmission of the data frame is performed from the first wireless communication unit to the one or more communication parties in conformity with the first communication method.

16. The communication apparatus according to claim 10, wherein at a timing independent from a transmission of a data frame from the second wireless communication unit to the one or more communication parties in conformity with the second communication method, the transmission of the data frame is performed from the first wireless communication unit to the communication party in conformity with the first communication method.

17. A communication method in a communication apparatus provided with a first wireless communication unit that performs a wireless communication in conformity with a first communication method and a second wireless communication unit that can perform a directional wireless communication in conformity with a second communication method using a frequency band higher than the first communication method, the communication method comprising:

a step of receiving a control frame including control information for effecting a coordination with one or more communication parties that perform a wireless communication in conformity with the second communication method by the first wireless communication unit, wherein with respect to the one or more communication parties, a frame including information for specifying a timing when the one or more communication parties should transmit a link maintenance frame for checking a validity of a communication link in conformity with the second communication method is transmitted from the first wireless communication unit in conformity with the first communication method, and wherein at the transmission timing, the second wireless communication unit transmits the link maintenance frame in conformity with the second communication method.

18. A non-transitory computer-readable medium having embodied thereon a computer program, which when executed by a computer, causes the computer to perform a communication processing method in a communication apparatus provided with a first wireless communication unit that performs a wireless communication in conformity with a first communication method and a second wireless communication unit that can perform a directional wireless communication in conformity with a second communication method using a frequency band higher than the first communication method, the communication processing method comprising:

transmitting a control frame including control information for effecting a coordination with one or more communication parties that perform a wireless communication in conformity with the second communication method from the first wireless communication unit, wherein with respect to the one or more communication parties, a frame including information for specifying a timing when the one or more communication parties should transmit a link maintenance frame for checking a validity of a communication link in conformity with the second communication method is transmitted from the first wireless communication unit in conformity with the first communication method, and wherein at the transmission timing, the second wireless communication unit transmits the link maintenance frame in conformity with the second communication method.

19. A non-transitory computer-readable medium having embodied thereon a computer program, which when executed by a computer, causes the computer to perform a communication processing method in a communication apparatus provided with a first wireless communication unit that performs a wireless communication in conformity with a first communication method and a second wireless communication unit that can perform a directional wireless communication in conformity with a second communication method using a frequency band higher than the first communication method, the communication processing method comprising:

receiving a control frame including control information for effecting a coordination with one or more communication parties that perform a wireless communication in conformity with the second communication method by the first wireless communication unit, wherein with respect to the one or more communication parties, a frame including information for specifying a timing when the one or more communication parties should transmit a link maintenance frame for checking a validity of a communication link in conformity with the second communication method is transmitted from the first wireless communication unit in conformity with the first communication method, and wherein at the transmission timing, the second wireless communication unit transmits the link maintenance frame in conformity with the second communication method.

20. A communication system comprising:

a first communication apparatus which is provided with a first wireless communication unit that performs a wireless communication in conformity with a first communication method and a second wireless communication unit that can perform a directional wireless communication in conformity with a second communication method using a frequency band higher than the first communication method and which transmits a control frame including control information for effecting a coordination with one or more communication parties that perform a wireless communication in conformity with the second communication method from the first wireless communication unit; and a second communication apparatus which is provided with a first wireless communication unit that performs a wireless communication in conformity with the first communication method and a second wireless communication unit that can perform a directional wireless communication in conformity with the second communication method using a frequency band higher than the first communication method and which receives the control frame by the first wireless communication unit to the first communication apparatus as the one or more communication parties, wherein with respect to the one or more communication parties, a frame including information for specifying a timing when the one or more communication parties should transmit a link maintenance frame for checking a validity of a communication link in conformity with the second communication method is transmitted from the first wireless communication unit in conformity with the first communication method, and wherein at the transmission timing, the second wireless communication unit transmits the link maintenance frame in conformity with the second communication method.

* * * * *